Oct. 13, 1942.　　　A. N. GOLDSMITH　　　2,298,476
TELEVISIBLE GUIDING SYSTEM
Filed July 19, 1939　　　10 Sheets-Sheet 1
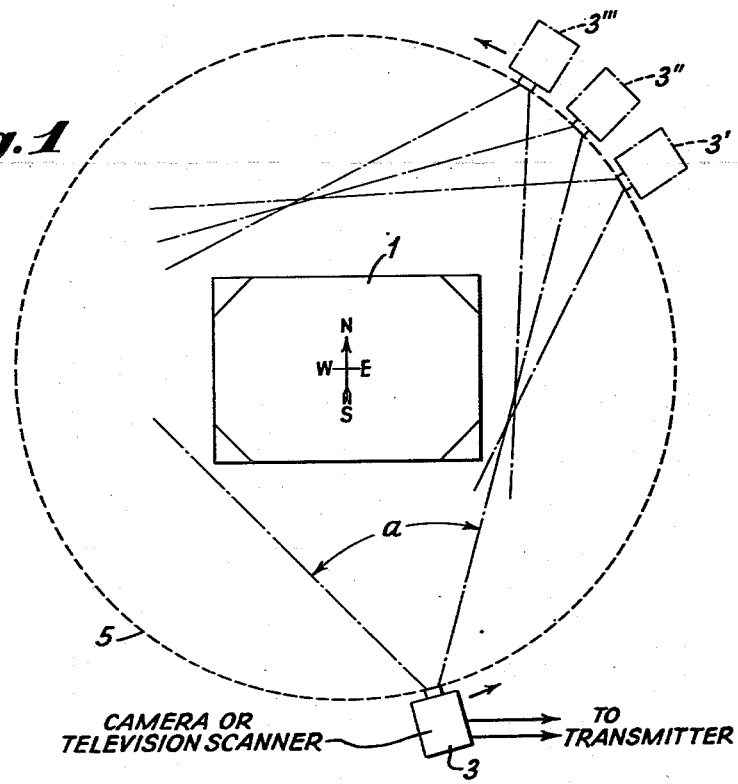
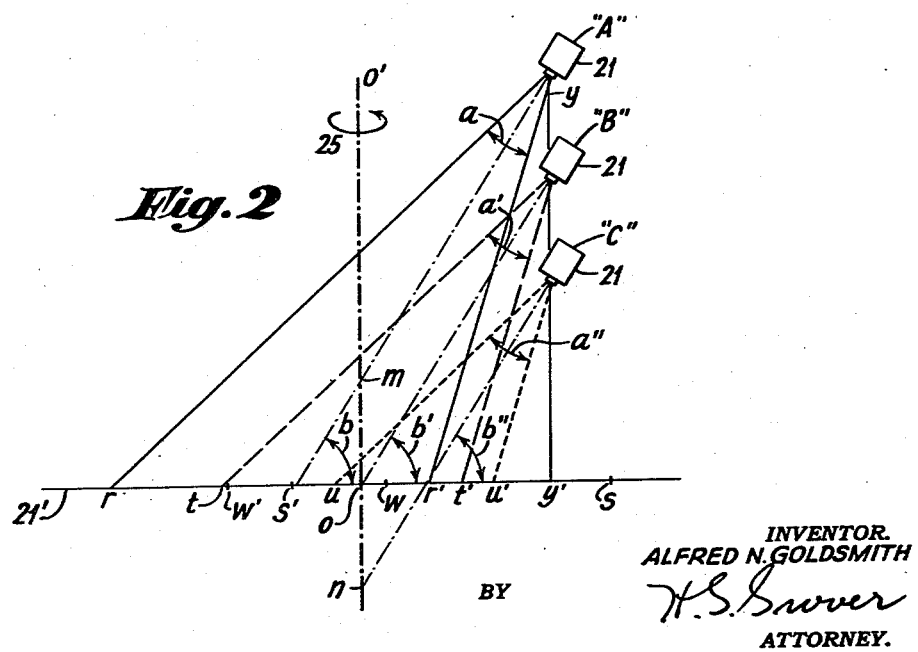
INVENTOR.
ALFRED N. GOLDSMITH
BY
ATTORNEY.

Oct. 13, 1942.   A. N. GOLDSMITH   2,298,476
TELEVISIBLE GUIDING SYSTEM
Filed July 19, 1939   10 Sheets-Sheet 2
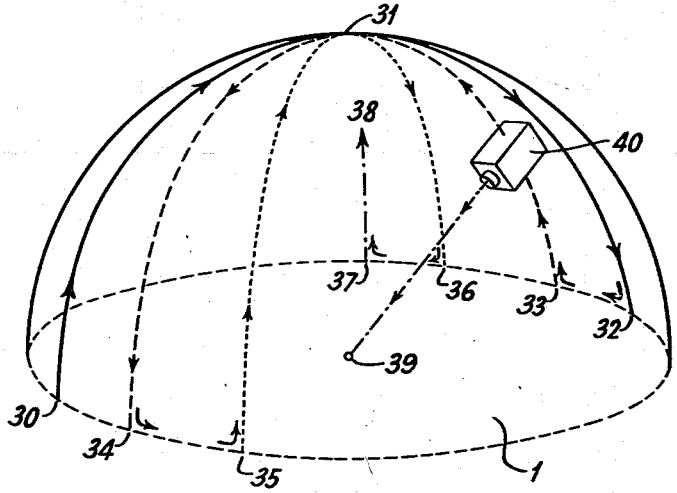
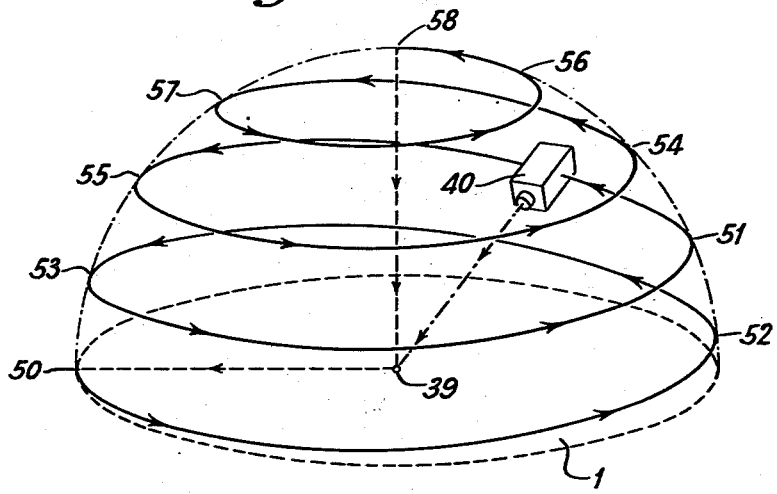
INVENTOR.
ALFRED N. GOLDSMITH
BY
ATTORNEY.

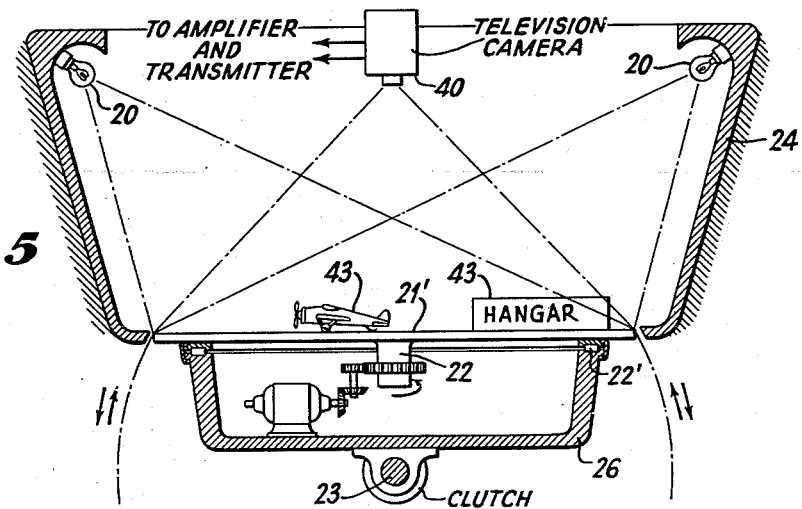
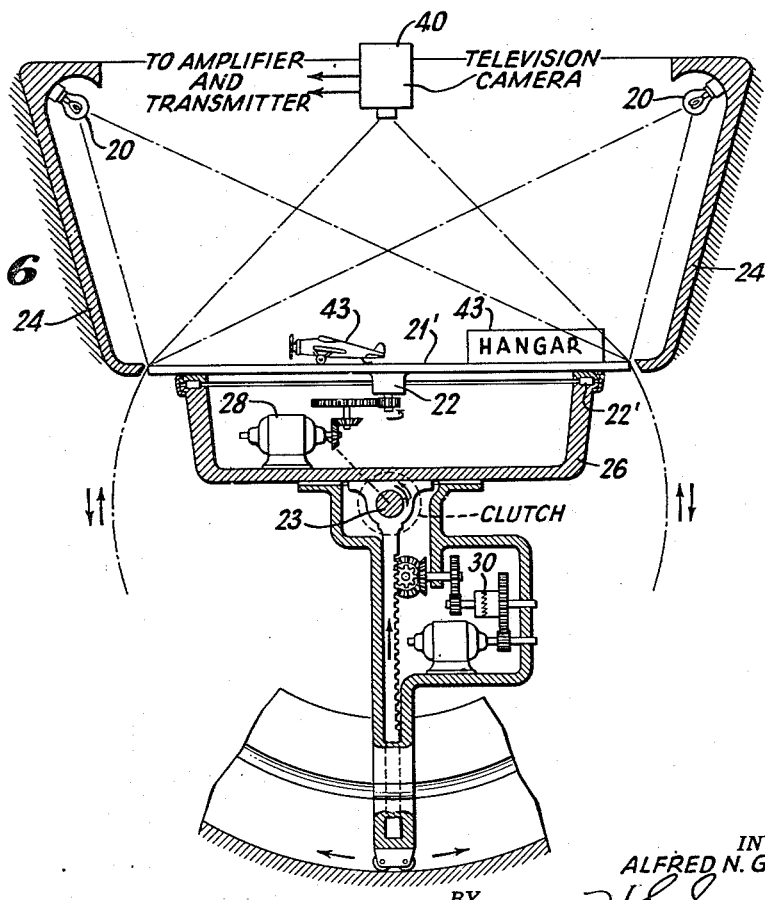

Oct. 13, 1942.　　　A. N. GOLDSMITH　　　2,298,476
TELEVISIBLE GUIDING SYSTEM
Filed July 19, 1939　　　10 Sheets-Sheet 4
*Fig. 7a*
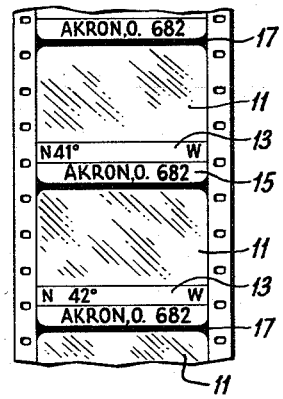
*Fig. 7b*
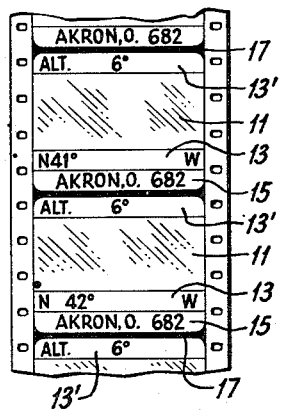
*Fig. 7c*
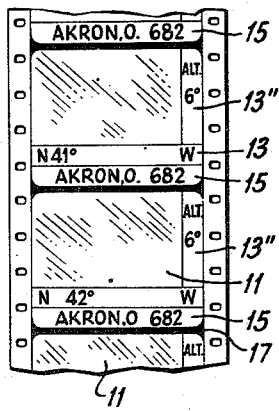
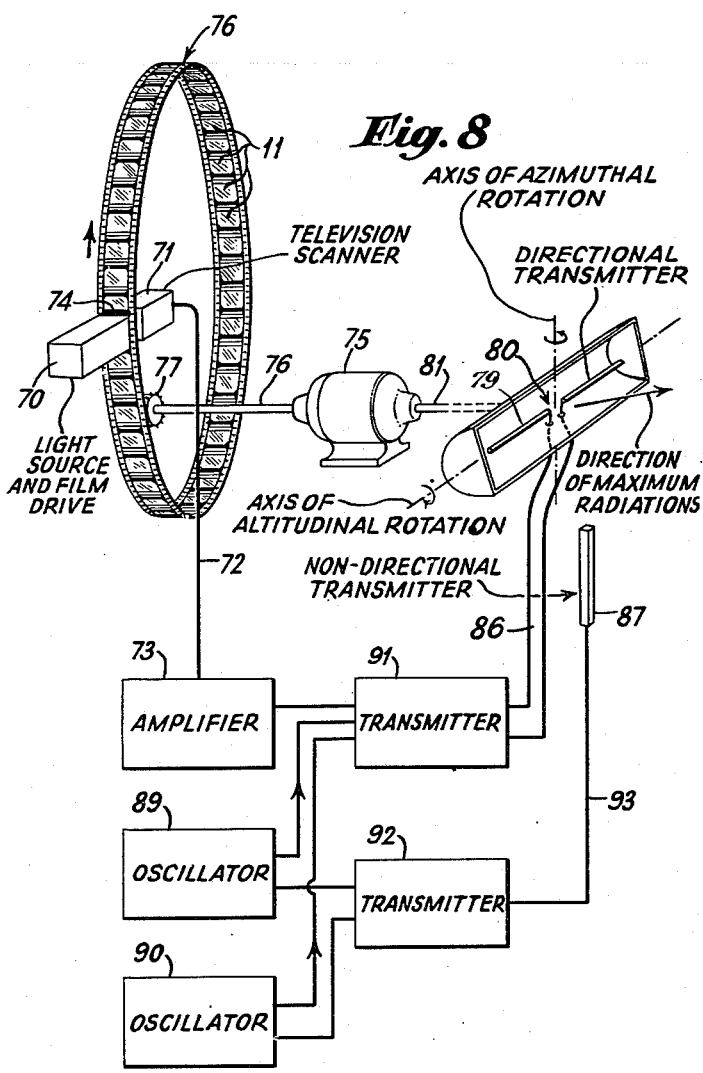
INVENTOR.
ALFRED N. GOLDSMITH
BY
ATTORNEY.

Oct. 13, 1942.   A. N. GOLDSMITH   2,298,476
TELEVISIBLE GUIDING SYSTEM
Filed July 19, 1939   10 Sheets-Sheet 7
*Fig. 13*
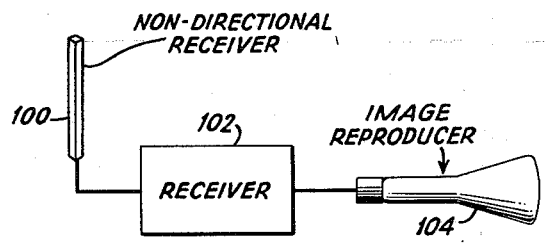
*Fig. 15*
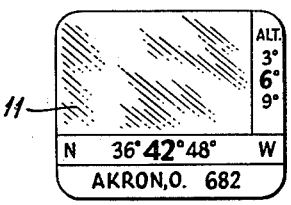
*Fig. 14*
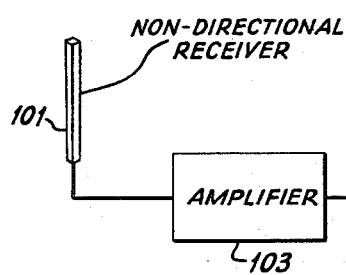
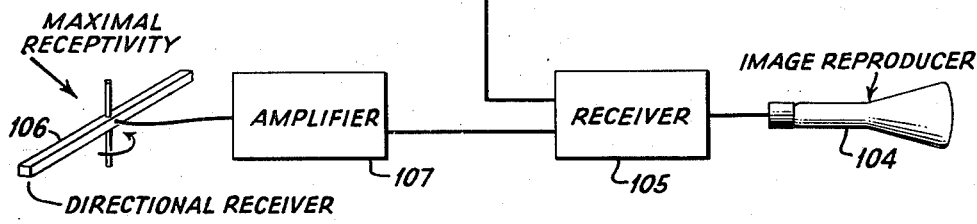
*Fig. 16*
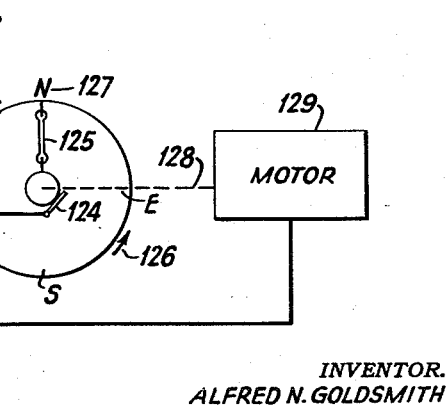
INVENTOR.
ALFRED N. GOLDSMITH
BY   *H. S. Grover*
ATTORNEY.

Oct. 13, 1942.　　　A. N. GOLDSMITH　　　2,298,476
TELEVISIBLE GUIDING SYSTEM
Filed July 19, 1939　　　10 Sheets-Sheet 8
*Fig. 17*
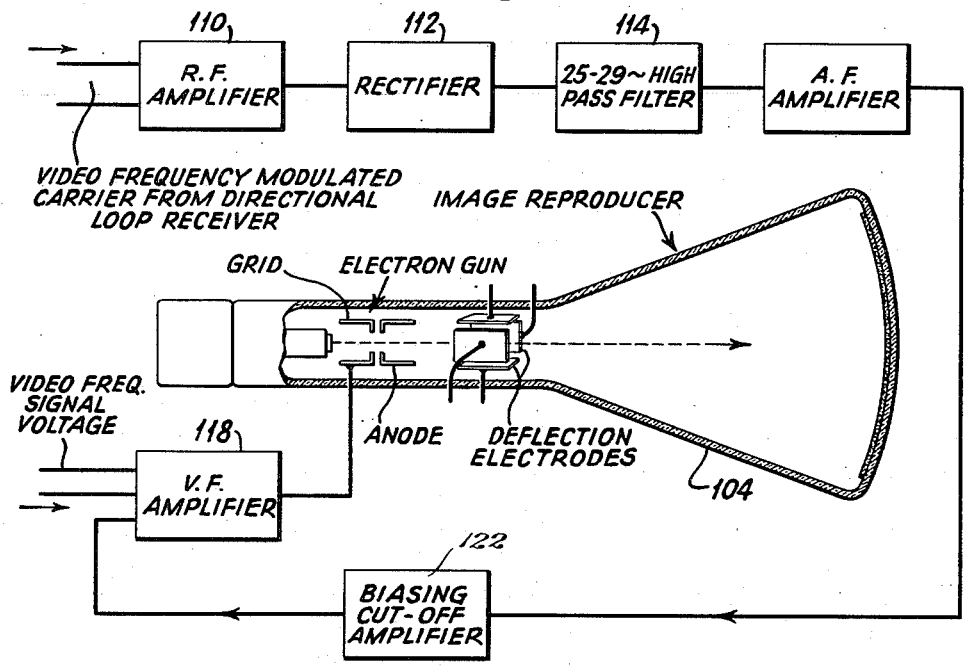
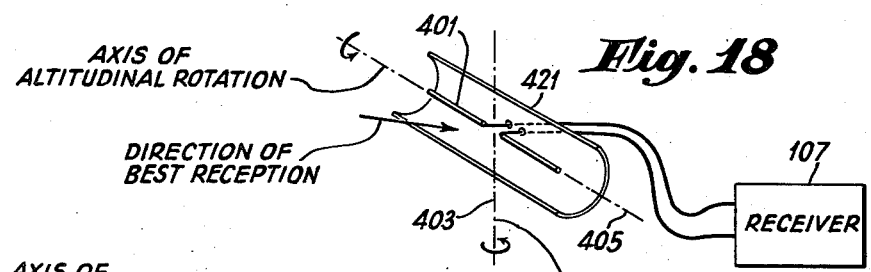
*Fig. 18*
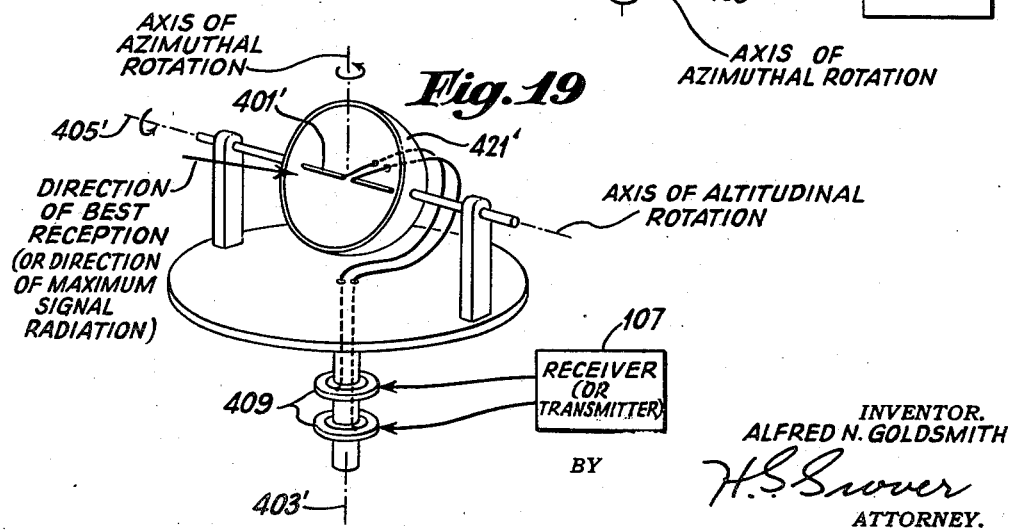
*Fig. 19*
INVENTOR.
ALFRED N. GOLDSMITH
BY H. S. Snover
ATTORNEY.

Oct. 13, 1942.  A. N. GOLDSMITH  2,298,476
TELEVISIBLE GUIDING SYSTEM
Filed July 19, 1939   10 Sheets-Sheet 9

INVENTOR.
ALFRED N. GOLDSMITH
BY
ATTORNEY.

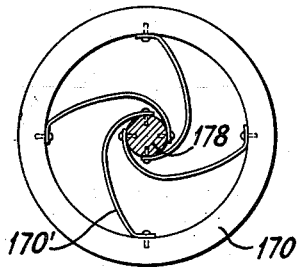
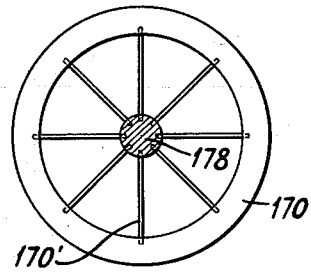
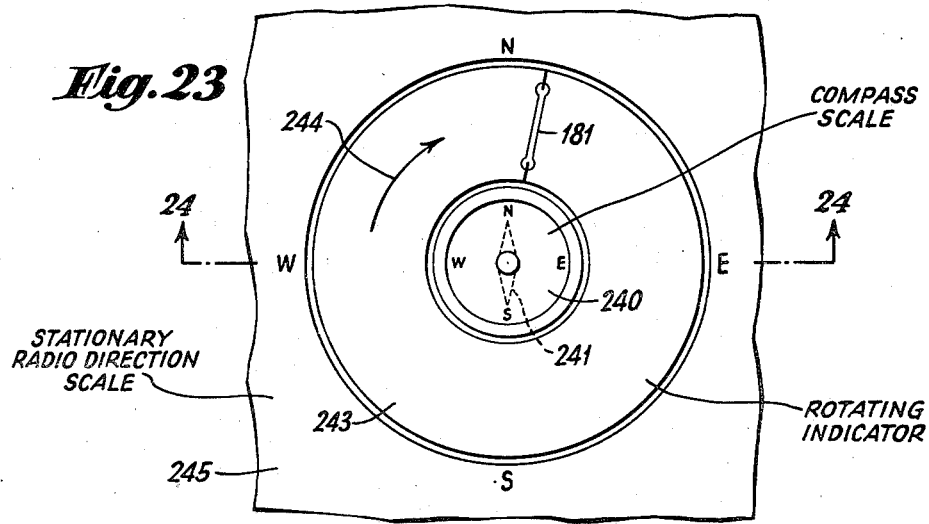
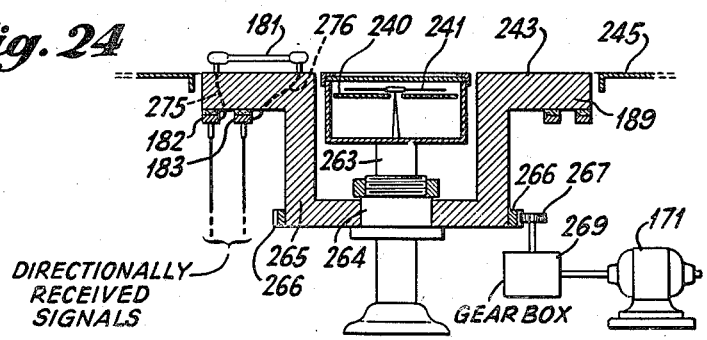

Patented Oct. 13, 1942

2,298,476

UNITED STATES PATENT OFFICE 2,298,476

TELEVISIBLE GUIDING SYSTEM

Alfred N. Goldsmith, New York, N. Y., assignor to Radio Corporation of America, New York, N. Y., a corporation of Delaware Application July 19, 1939, Serial No. 285,275

50 Claims. (Cl. 250—11)

The present invention which constitutes a continuation in part of my application Serial No. 153,330, filed July 13, 1937, and entitled "Televisible guiding means," relates generally to television systems and more particularly to television systems as applied especially to. guiding and directing private, military, naval or commercial aircraft and producing at the receiving point a visible indication of the character hereinafter to be more specifically discussed of some significant area or region or elements. The invention is also widely applicable to use for automotive, military, submarine and marine navigation, as well as other allied fields. For convenience of reference, however, the invention will be described herein primarily with respect to its utility in the aircraft guiding field.

In order to guide aircraft to airports or ships through harbors during conditions of poor visibility and low-hanging clouds when the ground, the landing fields or, for example, the shore line, is not visible to the pilots, or the aircraft or ship is not visible to the controlling stations, it has been customary in the past to transmit directing beams of radiant energy which are received by the pilots of the aircraft or ship and which enable them to guide the aircraft or ship to the landing fields or harbor.

These systems of the prior art have taken various forms. One system which is now in use which gives a reasonably accurate sense of bearing with respect to pre-selected central points or areas, but which system will not provide either any indication of a pictorial representation of the central point or area or any indication of the altitudinal or aximuthal location of the receiving point relative to the central point or area, is the system which transmits coded indications of pre-selected letters, such as the letters "A" and "N," and whereby when the direct path to the central point is being followed will sound as a series of a long "dash" signals.

Still other systems provide for the reception of signals to produce on a viewing plane of a receiver element a series of spatially separated dot elements to indicate either by their perspective locations or by the perspective relationship of the dot elements some special information with respect to the central point. Other systems have provided for the transmission of actual views of a central area provided that the central station first obtain signals sent out from the point intended to receive the view signals in order that the central station after having obtained by triangulation methods, for example, the actual bearing of the receiving point relative to the central area may send the corresponding and correct pictorial representation. Such systems, of course, require time consuming computations or manipulations (automatic or manual) prior to the selection of the view to be transmitted to the receiving point and are completely dependent upon the receipt of signals sent from the receiving point to the central point, and the transmission is always limited to a single view at a given time. Naturally, failure of the transmitter at the desired receiving point or a multiplicity of simultaneously received signals at the central point would make it impossible for the central station to receive a signal from which the bearing (azimuth) only could be obtained or to comply promptly and usefully with the transmission requests. Thus, such systems become quite useless from many practical aspects. And, further, such systems, even when in operation, are not so constituted as to be capable of transmitting to receiving points pictorial representations which portray both changing azimuth and bearing, as well as the altitude, of the receiving point relative to the central point or significant area or region.

Thus, while such safety measures as above suggested have proven to be of some help in aerial navigation they, nevertheless, do not convey to the pilots any pictorial representation of conditions actually existent at the airport nor do they convey to the pilots any direct information with respect to the distance actually intervening between the instantaneous location of the aircraft and the landing field; the azimuthal (bearing) and altitudinal directions to the landing field, nor yet any complete assurance of the actual elevation of the aircraft in flight relative to the landing field. Further than this, radio beacons, while useful in guiding aircraft, do not make possible for the pilot to determine the exact condition of the landing field or harbor with respect to incoming and outgoing aircraft or ships. Presently operated guiding means are so constituted that such information, as well as information relative to the direction from which the pilot should land, is conveyed to the aircraft or ship pilot by means of radio telephony supplementing the directional beacon.

The present invention is so constituted as to overcome such defects and does so by providing a system whereby the pilot of the aircraft not only obtains visible images or representations of the landing field but also obtains indications in accordance with the receipt of transmitted visual signals portraying both altitude and azimuth (bearing) where "altitude" as herein used refers to the "altitudinal angle" of elevation above or depression below a horizontal plane considered as a reference area and is not inherently a measure of distance.

As the term "azimuth" is used herein, as well as in the claims forming a portion of this specification, it will be understood that the azimuth of a line is the horizontal angle the line makes with a reference line, as a meridian. It is a term used substantially synonomously with "bearing," or as an alternative thereto, since azimuth may be measured continuously from 0° to 360° whereas bearing is usually and customarily measured in the several quadrants. However, "azimuth" when herein referred to will be understood as being measured from the south point around by way of west, north, east and south to 360°. Also, as in "bearings," reference may be made to "forward azimuth" and "back azimuth" where the back azimuth of a line will be understood as always differing from its "forward azimuth' by 180° and be ascertained by adding 180° when the forward azimuth is less than 180° and by subtracting 180° when the forward azimuth is more than 180°.

In considering the three-dimensional aspects of this disclosure it will be understood, in the light of the preceding comments, that the azimuth of any radius vector, indicating, for example, a direction of transmission or radiation, is the azimuth of its projection upon a horizontal plane, which may be the significant surface. The altitude is, of course, measured by the angle between the selected radius vector and the horizontal projection thereof upon the same surface for example. In addition, the present invention provides a system by which the pilot can be continually advised, merely by way of observations which he can make directly within his field of vision on a viewing screen, of changes from time to time in the location of other aircraft at the landing field or equivalent data as to availability of runways for landing, even though neither the aircraft nor the landing field is actually optically visible to him. Further than this, by way of visual indications, pilots landing aircraft at an airport unfamiliar to them are enabled to obtain a visual picture of the actual conditions at the airport even though such conditions never could be observed directly because of darkness, fog, low-hanging clouds (i. e., low ceiling), rain, snow, or the like.

The present invention provides also ways and means by which pictorial representations of the landing field may be transmitted either from scanning the landing field itself from different directions within a 360° arc about the field in sequence or from scanning the surrounding or contiguous territory from the landing field throughout selected angles included within a 360° range of vision in sequence. Also, the landing field may be scanned in a sequence of directions systematically changing in both altitude and azimuth, and depicting in their totality substantially all usual views of the field from an approaching aircraft. In addition, the present invention provides ways and means by which the landing field can effectively be scanned from all directions in sequence (to provide indications of the line of bearing or azimuth) and from various elevations (to provide altitudinal indications), in effect, through the arrangement of a scanning system positioned relative to a replica or model of the actual significant surface to be represented. The invention further provides ways and means by which a single permanent record, such as a motion picture film record, indicating, for example, various lines of bearing (azimuth) and altitudinally displaced views of the landing field or its runways from a series of selected viewing directions displaced both in azimuth and in accordance with different altitudinal directions, may be produced. The produced film may then be transmitted continuously and also with changes added thereto through separate transmissions combined therewith to indicate instantaneous changes in the actual conditions from time to time at the landing field. Such added changes, for instance, as will be described in further detail later herein, may be provided by the use of suitable electrical masking arrangements permitting the background, which in the suggested instance would be the film, to be scanned separated from the foreground, which, in the present instance, would be a representation of the instantaneous position, for example, of objects at the airport. A system for accomplishing such type of transmission with respect to separate background and foreground action has already been suggested and claimed in Goldsmith et al. U. S. Patent #2,073,370, granted March 19, 1937.

According to a further modification, the arrangement and viewing system herein provided makes provisions for the production of a plurality of different views of a significant surface to indicate different possible conditions of that significant surface insofar as the location of movable objects or the like thereon are concerned. For example, in a case where the invention is applied to televisible flying and the pilot of the airplane is desirous of knowing whether or not the conditions at the landing field are such that he may land the plane even though he cannot view the airport even from a short distance therefrom, such conditions of the airport may be pictorially transmitted to the pilot if different views of congested areas at the airport are transmitted as above pointed out. For example, in a case where there are three possible runways at the airport where the pilot may land, it may happen that two of the three runways are available for landing where as the third is not available because, for example, of wind conditions or of other uses for the runway. Accordingly, if a record is produced which would indicate the congested or unusable areas, namely, the third runway above assumed, the pilot will know which runways indicate restricted paths, or, where desired, the particular runway indicated from the transmission may be that which is available for landing. In any event, it is desirable to produce a plurality of separate records usually formed on film strips and indicating different angular views of the same surface and then to transmit individual records in accordance with the particular conditions at the field. In order to accomplish this result the separate film records indicating congestion or the lack of congestion over one or more of the possible runways may be moved into and out of register with the scanning device and transmitted.

Further, the present invention provides a system by which panoramic television image transmissions may be accomplished through the use of a directional transmission system for transmitting the visual signals by which the visual reproduction of such panoramic image transmissions may be controlled. Through the use of simultaneously transmitted non-directional (or directional) signals and the synchronizing and controlling signals (accompanied, if desired, by audio signals), the reproduction of the visual signals may be controlled. Further than this, the invention to be herein described is so constituted that each sequence of panoramically and directionally (as above noted these will be preferably bi-directionally, e. g., in azimuth and altitude) transmitted images is produced at a rate such that by taking recourse to the phenomena of image persistence, where due to visual-persistence or the rate of decay of fluorescent effects or otherwise, the resulting impression is that of substantial or acceptable continuity of receipt of a single desired image.

Further than this, the transmission and reception system to be described herein is so constituted that in the receipt of pictures or images, together with areas adjacent thereto, there shall be obtained visual indications of substantially the exact direction of the transmitter relative to the point of reception and, where desired, there may be, in addition, a visual identification of the transmitting station in the form of a printed description, a location, an arbitrary numerical designation, or the like.

In a further form the present invention makes provision for the cyclic transmission of a series of oblique views of any significant surface, such, for example, as a terrestrial surface of any nature such as an airport, a congested city area over which no airplane landing could be attempted, a high range of mountains, a series of guiding paths through mountain passes or the like. In such transmissions there is provided in the operation an appropriate relationship between the azimuth of scanning of the area and the azimuth of transmission upon which the electrical signals to represent the scanned area are transmitted. As will be appreciated from the description which is to follow the azimuthal direction upon which the signals are radiated will correspond to the back azimuth with the scanning direction corresponding to the forward azimuth. For all forms of scanning and the transmissions representative of the signals developed thereby the scannings and transmissions are always so arranged as to pass through a selected complete sequence (that is, a 360° sequence) of azimuths and these scannings along the selected azimuthal directions are then repeated at pre-established rates in a cyclic sequence.

Several forms of transmitting arrangements to provide for this form of signal transmission may be provided, as is obvious from what has been above mentioned as to the characteristics of the system to be herein described. In one form of such a system the cyclically repeated azimuthal directions of transmissions involve radiations of energy to represent signal energy corresponding to optical views which have no altitudinal directivity so that azimuthal directivity is obtained. This form of transmission, however, is obtainable with the omission, for purposes of system simplification, of certain detailed information conveyed by the transmitter because of the lack therein of any clearly defined or unique altitude of transmission or "televisible" viewing.

With little modification in the system it is possible to provide for the transmission of signals which form a cyclic series of directional azimuthal transmissions and a single (or mono-defined and preferably arbitrarily chosen) altitude of directional transmission. In this form it will become apparent at once that the radiated signals are always directed along a path obliquely upward (or, under some special circumstances, as will herein be described, obliquely downward) at a specific and arbitrary angle, and thus at constant altitude. However, such a form of transmission provides for the transmission along progressively changing or sequentially chosen azimuthal paths. It becomes of special importance particularly in the case where the selected altitudinal transmission coincides with the preferred path of glide of an airplane in its approach to a landing field, for example.

With still further improvements and refinements in the system of televisible guiding control, herein to be described, it will become apparent that the signals representative of the viewed significant area or region may be a cyclic series of azimuthal directional transmissions together or combined with related cyclic series of altitudinal directional transmissions. In this form of the system it will be appreciated that both the azimuthal and altitudinal variations are related to the scanning direction of viewing of the significant surface for the corresponding transmitted pictorial representation. This provides, of course, for directional transmission in direction opposite to the viewing direction in both altitude and azimuth, where there is a controlled and significant altitude as well as a controlled azimuth only, or a controlled azimuthal relationship coupled with a pre-selected and significant altitudinal relationship of the cyclic series of signals.

Accordingly, it is one of the primary objects of the present invention to provide a system whereby aerial navigation or navigation through harbors, through fog, darkness, bad weather, water, smoke, and the like may be materially assisted and made possible and the so-called "blind flying" may effectively become unknown through the use of what might be termed "tele-visible" guiding means which provides true indications of both bearing (azimuth) and altitude. Another object of the invention is to provide a system by which marine or aerial navigation may be simplified and made relatively safe irrespective of weather conditions and darkness preventing actual vision of the path to be followed during navigation.

Other objects of the invention are to provide a system for assisting in navigation which will be relatively simple in its arrangement and construction and which will be possible to install with a minimum degree of inconvenience, a minimum number of receiving parts and without requiring any considerable space in installation or weight (or any related transmitter on the plane) to be transported.

By the establishment of networks of such transmitting stations strategically located, an airplane pilot can, in effect, view the entire terrain over which he passes, despite practically zero distance of optical visiblity and thereby see through the aid of electro-optical and radio means both the topographical details and their actual direction relative to the source of signal origin. Thus one pilot will have, through the radio visual means thus provided, the equivalent of optical vision under conditions where actual optical vision is impossible.

A further object of the present invention is to provide a guiding system wherein a significant region may be scanned from different azimuthal directions from either like or progressively changing altitudinal directions and whereby signals representative of the scanned area may be transmitted synchronously with the scanning and with changing azimuthal and altitudinal (where present in the scanning) directions.

Still further, the present invention has as one of its further objects that of providing for scanning a significant surface or area to produce image signals representative of that area viewed from both progressively changing azimuthal and altitudinal directions, together with provision to control the relative rates of change in the progressively changing azimuthal and altitudinal scanning directions.

Still other objects of the invention will become apparent and suggest themselves to those skilled in the art to which the invention is directed upon reading the following specification and claims in connection with the drawings forming a part of these specifications.

By the drawings, Fig. 1 illustrates schematically the method by which either the actual scene or significant surface, or a tri-directional model thereof, may be scanned for transmission from a series of scanning points located in all directions surrounding the surface;

Fig. 2 illustrates in schematic manner the extra-peripheral and inward viewing or scanning of the significant surface of Fig. 1 wherein the scanning of the actual surface or a model thereof is arranged to take place from along a viewing line of direction of equal altitude and given instantaneous azimuth from points appropriately selected for scanning which are remote to the significant surface and which may pass through a sequence of directions as azimuth changes and whereby the instantaneous transmission of signals is along a line corresponding to the "back azimuth" of the line of viewing;

Fig. 3 represents schematically one method for accomplishing three-dimensional scanning of the field of view which may be either the actual field or a tri-directional model of the actual significant surface;

Fig. 4 represents a modification of the arrangement shown by Fig. 3 but wherein altitudinal changes occur slowly with respect to azimuthal changes;

Fig. 5 also represents in schematic form an arrangement for scanning according to the system shown by Fig. 3 and particularly adapts the method of Fig. 3 to the scanning of a tri-directional model of the actual significant surface;

Fig. 6 represents schematically an arrangement for scanning according to the method described by Fig. 4 and adapts the method particularly to the transmission of an image of a tri-directional model of the actual significant surface to be represented.

Figure 9A:
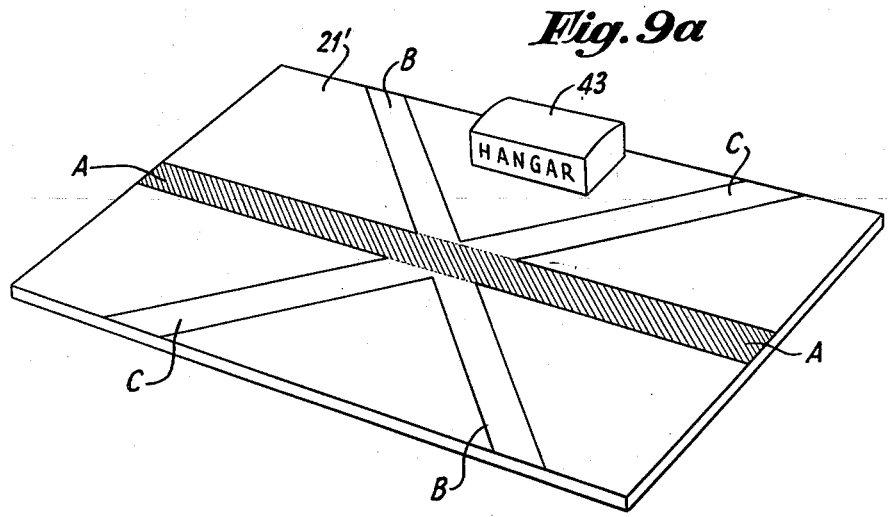
Figure 9B:
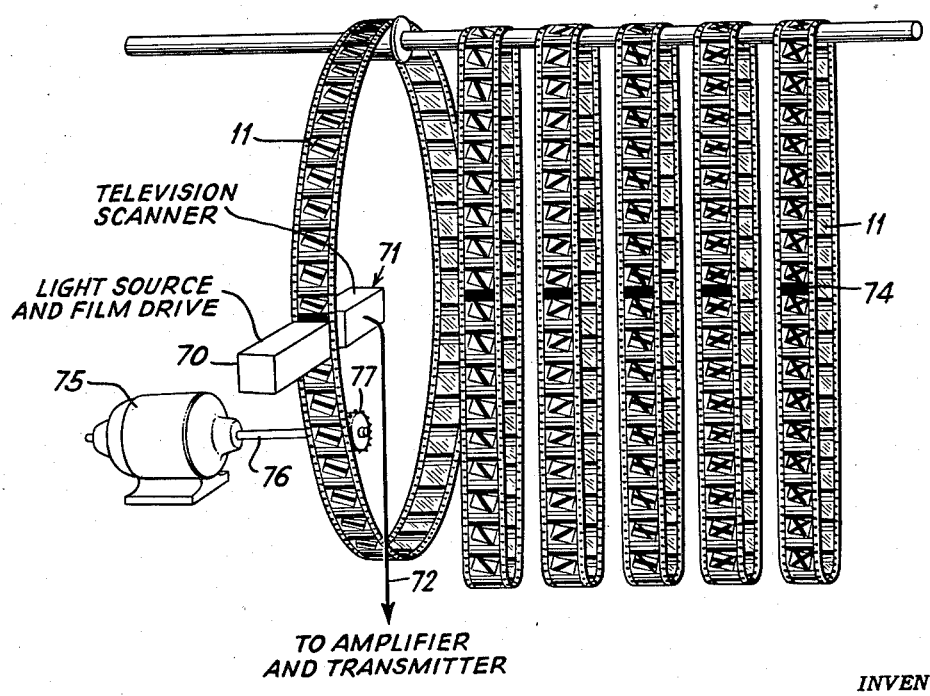

Figs. 7a, 7b and 7c schematically represent the types of record which may be produced by the apparatus of Figs. 5 and 6 where, in lieu of direct transmission, a record from a previously prepared film or other analogous type recording is to be transmitted to indicate different lines of bearing for different angular views of the significant surface or a model thereof;

Fig. 8 illustrates schematically one form of system for transmitting the message recorded produced on a film or other record surface such as that shown by any of the forms of Fig. 7;

Figs. 9a and 9b indicate forms of an arrangement by which it is possible to indicate either a congestion or lack of congestion on the significant surface. In this figure, Fig. 9a indicates possible conditions at an airport or in a harbor or the like of which different views are produced and Fig. 9b indicates the manner in which these different views are brought into register and out of register with a scanning device.

Figure 10:
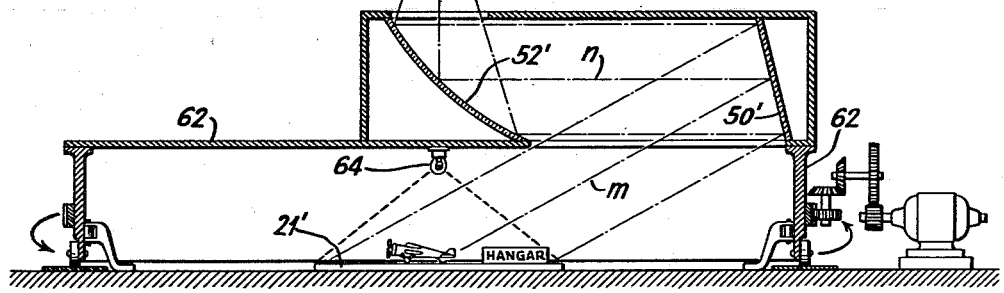
Figure 11:
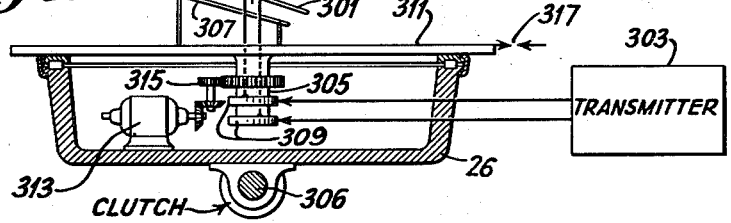
Figure 12:
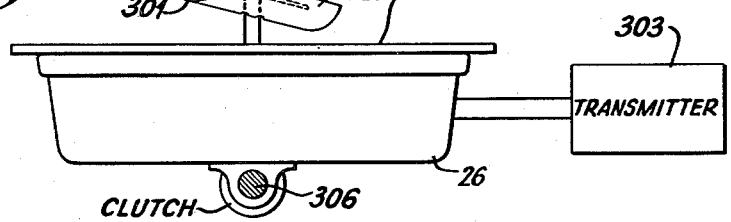

Fig. 10 illustrates a modification of the arrangements of Figs. 5 and 6 and is particularly adapted to producing different views of a significant surface according to the plan suggested by Fig. 1, wherein the amount of elevation from which the views are initially produced remains fixed, and the significant surface is viewed from different bearing points surrounding the significant surface for 360° along a substantially constant angle of altitudinal path representing, for example, the preferred angle of approach of an airplane to a landing area;

Fig. 11 diagramatically represents one form of transmitter system;

Fig. 12 diagrammatically represents another form of transmitter system;

Fig. 13 diagrammatically illustrates one form of receiving system;

Fig. 14 represents a modification of Fig. 13 and provides for receiving both the directional and non-directional signals transmitted from a system such as that shown, for example, by Fig. 8;

Fig. 15 schematically illustrates the replica of the image of Fig. 7 produced at the point of reception; and, Fig. 16 is a modification of the receiving system shown by Fig. 14, and, Fig. 17 represents a system for controlling the receiver of Fig. 14, for example.

Fig. 18 schematically represents a form of receiver system.

Fig. 19 is a modified form of receiver.

Figure 20:
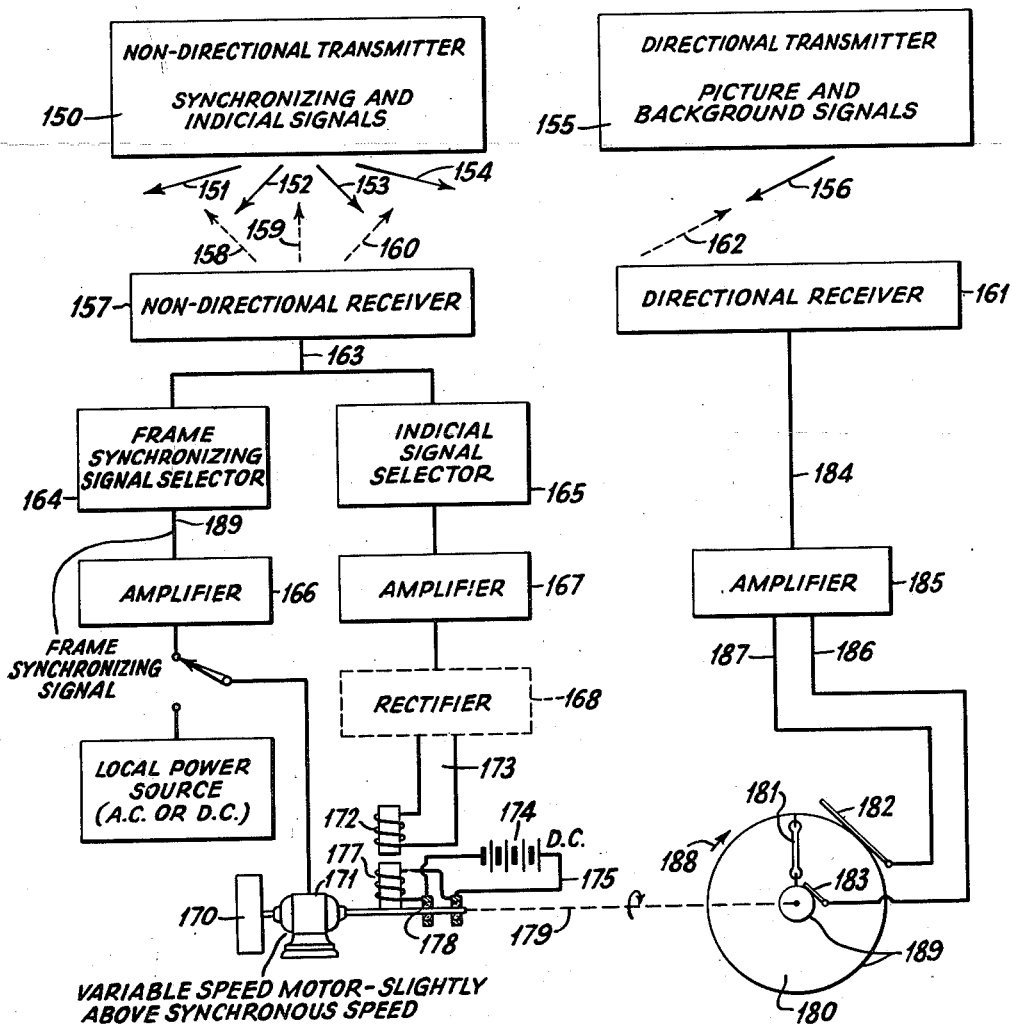

Fig. 20 represents a further improvement of the general arrangement shown by Fig. 16 and provides a system whereby the direction of the incoming signals and the operating condition of the system may be determined.

Figure 21:
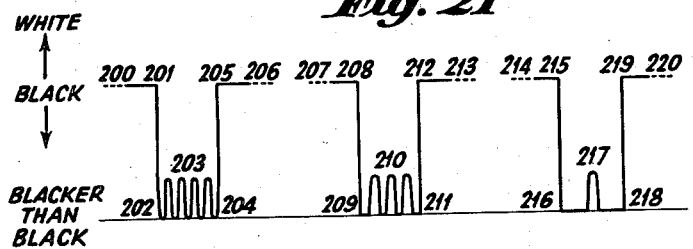

Fig. 21 indicates several forms of incoming synchronizing impulses for controlling the system and particularly that of Fig. 20.

Figs. 22a and 22b represent schematically two forms of resiliently driven flywheel arrangements for use with the arrangement of Fig. 20.

Fig. 23 has a partial plan view of the compass and indicator arrangement of Fig. 20, and, Fig. 24 is a schematic sectional elevation of the arrangement of Fig. 23 taken on the line 24—24 of Fig. 23.

Referring now to the drawings for a further understanding of this invention, it will be seen that the system to be herein disclosed provides for the scanning of the actual significant surface from a series of angularly displaced peripheral positions (that is, points of different altitude and/or bearing or azimuth) or for the scanning of the actual significant surface from a central position through a series of viewing directions angularly displaced in bearing or azimuth as well as altitude where desired. In connection with each of these types of scanning, it will be appreciated that instead of scanning the actual significant surface a bidirectional or tri-directional model of the actual significant surface may be scanned with equally satisfactory or even superior results. Further, with respect to the scanning, it should be understood that wherever the scanning of the actual surface is to take place, it is usually convenient and desirable to create a sequence of still pictures having the desired angular displacements one from the other which would be scanned for transmission purposes in sequence, while for conditions where a model of the significant surface is to be scanned it is usually preferable, although not necessary, to provide for direct television scanning of the model of the significant surface rather than for the scanning of a photographic or a pictorial representation of the significant surface.

Further than this, in connection with this invention it should be understood that the actual scanning may be provided by moving the actual scanning instrumentality in a given path relative to either a model of the significant surface or to the surface itself or, where a model of the significant surface is provided, there may be provided a motion of the model along a path relative to the scanner which is the inverse of that of the scanner relative to the surface for providing the same effects. It is also possible to accomplish and produce the relative motion of significant surface and scanner by maintaining both of these fixed elements but interposing between them a suitable optical system for the systematic introduction of angular displacements.

In these forms of systems the significant surface or area is scanned from angularly displaced directions which are radial to the center of a solid angle which is substantially centered upon the significant surface and the solid angle selected is then always bonded by a circle which is smaller in diameter than a great circle of the sphere on which the solid angle is measured. The smaller circle usually constitutes the boundary because of the fact that it is, as a practical matter, useless to extend the scanning to a viewing direction co-planar with the significant surface region, where the significant region is bordered by flat or substantially flat terrain for example, or because it is desirable that the viewing direction shall, for example, where the significant surface or region is upon a high plateau or mountain peak, extend beneath the plane of the significant surface or region. In each instance the summation of the scanning sequence defines in its totality the selected solid angle.

As it will be referred to in the claims hereafter, it is to be understood that a solid angle by which the scanning of the significant surface is defined, may be specified or defined by various methods. In one of these methods the solid angle is defined by its apex or center and by the boundary of a surface on a sphere centered on said apex.

It will thus be appreciated that a solid angle exists at its apex but is measured in accordance with the rule here set forth.

In the second mode of defining a solid angle, it is necessary to specify the center or apex thereof together with the surface area subtended by the solid angle on a sphere centered at its apex. To define such a surface it is necessary to specify a number of points thereon sufficiently closely spaced to indicate adequately the nature and dimension of the said surface.

The first above-mentioned method of specifying a solid angle is particularly useful in connection with scannings of constant altitude and variable azimuth where the limiting boundary of the surface is in fact a circle of the sphere (and generally a small circle thereof) and wherein no scanning directions pass through points lying within the surface but only on its boundary.

The second method of specifying a solid angle is more useful in connection with methods of scanning the significant region wherein the scanning directions vary systematically in both altitude and azimuth and, accordingly the radial scanning directions may be passing through at a multiplicity of points on the surface defining the solid angle within which scanning is effectuated.

With the significant surface or region so scanned, it will be appreciated that the scannings should be repeated for example at the rate necessary at the receiving points either to preserve persistence of vision or effects substantially equivalent thereto, and such repetitions should occur always in a selected cyclic sequence insofar as image discernability or intelligibility are concerned.

In the sense of the first method of specification given above, a solid angle is defined then by its center and by a number of points upon the boundary of the surface subtended by the said solid angle on a sphere centered at the apex thereof. It will be understood that the points on this boundary should be sufficiently closely spaced to define satisfactorily the limiting boundary in question which, in general, is not a great circle.

The solid angle, as is well known, is measured by the product of 4 pi (4 x 3.1416) steradians multiplied by the ratio of the area of the said surface on the sphere to the area of the entire surface of the sphere. It will thus be appreciated that a solid angle exists at its apex but is measured in accordance with the rule here set forth.

In the second mode of defining a solid angle, it is necessary to specify the center or apex thereof, together with the surface area subtended by the solid angle on a sphere centered at its apex. To define such a surface it is necessary to specify a number of points thereon.

With each scanning of the significant surface or region electrical image signals are developed (as will herein be described in further detail) and these signals are then transmitted, in a manner to be hereinafter described, along outwardly radiating paths which are directed or pointed obliquely outwardly from a selected point or section of the significant surface or region upon and opposite to the corresponding chosen radial directions of scanning. It is also desirable under such circumstances to transmit, with the image signals and along either directional or (preferably) non-directional paths, synchronizing signals which will synthesize the produced images developed at the receiver points with the transmitter. Then it is preferable to provide for limiting the image at each receiving reproduction to a minor fraction of the total number of cyclically repeated representations of the significant surface or region in order that those views received shall be only those particular views which would be discernible were optical vision utilized. The non-directional synchronizing signal transmission serves better to maintain a stable scanning regime due to signal continuity.

Inasmuch as the utility of the hereindescribed system depends largely upon the availability at any anticipated receiving location of a transmitted picture corresponding closely in viewpoint to the direction of the receiving location relative to the significant surface, it follows that the sequence of directional transmissions herein contemplated are derived from scanning directions of the significant surface, which are closely adjacent or nearly, but not actually or necessarily, the same.

Therefore, the successive directional scannings of the significant surface may differ from each other as a result of actually or effectively moving the pick-up, or scanning camera, from one direction to the next direction between successive scannings, or continuously moving the camera or scanner between one direction and the next during the actual scanning operation.

Thus the terminal directions referred to above are what will herein be termed "quasi-repetitive," because they result in the depiction or delineation of the scanned significant surface to produce views of the surface which are nearly, but not necessarily, alike.

So considered, "quasi-repetitive" scanning may be regarded as a scanning of the significant surface from a direction closely adjacent to the direction of the preceding scanning, or a scanning from a continuously changing series of directions, the initial and final directions in which series are approximately adjacent.

Also, from the description herein to follow, it will be appreciated that the system in all of its preferred forms is so constituted that zenithal viewing of the significant surfaces is substantially incidental to the operation. Substantially all scanning directions are non-zenithal, and thus the image signal groups representing the significant surface are groups which portray the significant surface in its true perspective, such as would result from viewing thereof by an observer who viewed the surface obliquely from the scanning direction.

Referring now more particularly to Fig. 1 for a more complete understanding of this invention, the actual significant surface 1 or a scale model thereof which is to be panoramically scanned and correspondingly transmitted, is arranged to fall within the field of view of a television scanning camera 3 (or a motion picture camera to make a pictorial record thereof which may later be transmitted, as will herein be described). The scanning camera 3 is so located as to be capable of being moved about a path 5 which is preferably circular relative to the central-most portion of the significant surface 1. In one important adaptation of the invention in aerial navigation control or guiding systems the significant surface 1 would, for example, be the airport at which the airplane was intending to land or over which area the airplane should pass along a guided path. In connection with a use of this invention in marine navigation, the significant surface 1 would be the harbor into which the guided ship might desire to be directed by following the proper course. Or the significant surface might be a section of mountainous territory or a representation thereof so that by appropriate transmission of television signals to represent such hazardous territory, for example, from an automatically operating station, the airplane may be safely guided thereover.

The television or scanning camera 3, while shown only in a conventional manner herein preferably includes an electronic image scanning tube of the general character known as the "Iconoscope" which has been described by Zworykin, for example, in the Journal of the Institution of Electrical Engineers (British), vol. 73, No. 442, October 1933 on page 440 et seq. and also in the Proceedings of the Institute of Radio Engineers for January 1934. When using such forms of scanning tubes the signal output is directed into suitable associated amplifiers, and deflection control circuits of well known type to control the scanning operation. The amplified signal output from the scanning tube (which signals are frequently termed the "video" signals) are supplied, together with appropriate synchronizing signals, in a manner well known to a modulator and the transmitter by which the developed signals are radiated or distributed in preferably a directional manner. The above referred to electronic image scanning device which has become known in the art by the registered trade-mark names "Iconoscope" and "Iconotron" comprises in brief, a tube in which there is developed within the neck portion a cathode ray beam which is directed to impinge upon a target or mosaic electrode upon which an optical image of the field of view to be transmitted (such as the viewed significant region) is suitably focussed by optical means. By means of suitable electron beam deflecting means (as is well known) the developed electron beam is caused to traverse the tube target or mosaic electrode according to a pre-established pattern of traversal. The mosaic electrode of the scanning tube is formed from the combination of a conducting signal plate, a dielectric element and a photoelectric layer or film. The signal plate has one side thereof connected to the external amplifying circuit. The opposite side of the signal plate supports an insulating layer or dielectric element, which is frequently a mica sheet. On the side of the insulator which is most remote from the signal plate many photoelectric particles which are electrically mutually insulated one from the other are supported. One method by which the photoelectrically sensitized mosaic surface may be produced upon the insulating layer or sheet of the mosaic electrode has been described and claimed in U. S. Patents No. 2,065,570 of December 29, 1936, and No. 2,020,305, November 12, 1935, of S. F. Essig, and reference may be had thereto for further detailed description of this portion of the invention. However, any other form of image pickup tube to accomplish the same objectives may be used in any appropriate and customary manner.

One suitable form for the television camera in which the image transmitting tube of the character above described is positioned and, in which camera is included at least a portion of the amplifier system, has been described in A. V. Bedford and K. J. Magnusson Patents Number 2,162,908, issued June 20, 1939, and Number 2,237,403 issued April 8, 1941, although it is to be understood that the means disclosed in the latter patents for moving the television camera from one point to another need not necessarily be included as a part of this invention, although the focusing and view finding arrangements therein disclosed are entirely satisfactory for use in the present invention.

In order to obtain different angularly displaced views of the field of view or significant surface 1 of any character above defined the television or picture camera 3 may be moved about the circular path 5 relative to the significant surface 1 in the direction shown by the arrows, for example. With the scanning camera motion taking place along this path, the scanning means assumes in succession the several indicated positions 3', 3" and 3"', etc., so that the field 1 is scanned in sequence from different lines of bearing or azimuth. The viewing range of the television camera 3 may be assumed to correspond to that designated by the angle $a$ included within the dot-dash lines from the several positions of the camera pointing toward the significant surface 1. In practice, the camera 3 is at least somewhat elevated above the plane by surface 1, and points obliquely downward to give significant and instructive views of surface 1.

Under normal conditions, it is usually desirable for the sake of providing continuity of the pictorial representations at the receiving points to space the sequential positions at which the various representations are made at say approximately 12° from each other, so that where the picture repetition frequency is of the order of 30 complete picture frames per second only one second of time will elapse between successive transmissions of the same or identical image. It is, of course, to be understood that the present invention is not limited to any specific angle such as that angle herein mentioned since in use it is obvious that in many receiving systems and devices for reproducing the transmitted images the image is caused to appear upon the luminescent or fluorescent screen of a cathode ray tube. Many such screens or targets have long time delay periods, for instance of the order of 12 seconds, so that the assumed 30 picture frames per second may represent the adopted transmission image rate and the hold over period of the screen will provide image retention qualities favorably comparing with the sequential and separate transmission of views at wide angle separation but with the angular view separation reduced to an extremely small angle of 1°, for instance. Various other intermediate degrees of separation of the views naturally may be adopted in accordance with conditions of the view producing surface of the receivers for reconstructing a visable replica of the significant surface 1.

Of course, where the actual significant surface is to be scanned by the television camera 3, of the character above described, it is usually preferable or even necessary under some conditions to substitute for the television camera 3 in producing the initial record a motion picture camera of the usual intermittent type which, for each angularly positioned view of the significant surface 1, will be so adjusted as to photograph one frame only of a motion picture record. The produced record (see Figs. 7 or 9b for example) may then later be transmitted in accordance with the manner of transmission to be described, for example, in connection with a system of the type shown by either Figs. 8 or 9b, as well as any other form herein set forth.

Where, however, the signals for transmission are produced by the scanning of a bi-directional or tri-directional model of the actual significant surface with selected different altitudinal and/or azimuthal separation of the views the television camera of the type herein above described is usually preferable for scanning. In such event a model of the actual significant surface 1 is located before the field of view of the camera and to produce the effect described by Fig. 1 the model is moved relative to the camera 3 in inverse order to that in which it is desired that the camera shall rotate relative to the actual surface 1 in Fig. 1. During the time periods elapsing between successive scannings (the time permitted for transmission of the frame synchronizing signal, for example, and usually occupying periods no greater than 10% and sometimes less of the total time for transmission of each viewed area) the model can be moved ahead by intermittent and stepped motions (not herein specifically illustrated for reasons for simplication of showing) so that each successive scanning of the model of the significant surface will take place with the desired angular separation of each separated scanned field of view from that immediately preceding. With this method of intermittent motion of the model it will be apparent that during the actual scanning period the entire model will remain substantially fixed with respect to the television camera.

When the photographic record is produced, for example, by photographing the significant surfaces from the angularly displaced positions, and assuming that there is provided for each chosen degree of angular displacement a separate view, each successive film frame 11 (see Figs. 7a, 7b and 7c) would represent the change for each successive position from which the photograph is taken. Immediately beneath each successive film frame 11 there is preferably located a designating strip 13 upon which is placed an indication of the angular position represented by the particular field of view. The illustrated film of Fig. 7a shows some of the areas within the quadrant for the 90° between north and west, for example. This condition of viewing is designated on the strip 13 by the letter "N" (for north) shown on the left margin of the strip and the letted "W" (for west) shown on the righthand margin of the strip. The actual angular position is indicated, for example, by the numerical indications of bearing or azimuth, such as the indications 41°, 42°, 43°, etc., appearing intermediate the letters "N" and "W".

Along a second strip 15 of the film 11 preferably immediately adjacent the bearing indicating strip 13 is a designation of the field of view which is to be represented by the pictorial representation. Also, where desired, a numerical indication for the particular geographic area may be used as shown conventionally by "Akron, O. 682" appearing on strip 15. This might mean that landing field Number 682 is located at Akron, Ohio, and, obviously the pilot knows or can determine from available charts the general conditions and unique features of this field. Where different altitudinal views are transmitted there is preferably marked, for instance in the strip 15, an indication of the angle of altitude from which the view of the landing or significant area is taken, such as by the designation "Alt. 30°."

However, where it is desired that the transmission of views of the significant area shall be representative of different altitudinal viewings of that area, as well as progressively changing azimuthal viewing, it is frequently desirable to place on the record strip (as shown by Figure 7b) immediately above the view 11 of the significant region and below the film frame separating strip 17, a separate indicial strip 13' which shall indicate the altitude from which the adjacent view 11 of the significant region is taken. As an alternative, of course, (and as shown for convenience of illustration only, and not as a typical form of film in combination with the other film frames) a marginal strip 13" closely adjacent the perforations of the film but still within the field of view of the image scanner may replace the strip 13'. By using this last named form of indicating strip 13" to portray the altitudinal displacement of the view, the vertical positioning of the indications of the altitudinal angle may be considered in many instances to be more directly related to altitude, as it is usually considered than would be the indications appearing in the horizontal plane. Still further, the vertical displacements of altitudinal indications in some senses are preferable to the horizontal indications because it is less difficult to preserve, with a vertical strip, the desired aspect ratio of the view and still not increase the film width or the height of the frame. In this way by changing the location of the altitudinal indicia from frame to frame on the film either between left and right-hand positions in the strip area 13' parallel to the strip areas 13 and 15 or between top and bottom in the indicia area 13" parallel to the edge of the film (as shown by Fig. 7c), it is, of course, apparent in any case where the directional reception is such that more than a single film frame shall be instantaneously visible due to viewing screen persistence, for instance, that indication of altitude which appears brightest on the screen will indicate the direct altitudinal viewing path, as is apparent, for instance, in a similar manner with respect to the bearing or azimuthal indication provided by the indicating strips 13.

In connection with the use of a prepared film strip for transmission such as the film strips shown schematically by any of the Figs. 7, 8 or 9b, it is recommended that the aspect ratio of the complete transmitted or scanned area shall preferably be unity, although it is to be understood that the invention is in no way restricted to such aspect ratio, because of the frequently established use in television transmission of films having a 4 to 3 ratio. However, by utilizing a film aspect ratio of substantially unity, such as that shown by Fig. 7, it can readily be seen that the strip areas to indicate location bearing on altitude are all preserved and still the desired aspect ratio of the significant area is itself substantially that which one customarily uses for the usual film transmission with the 4 to 3 aspect ratio. Still further, by providing unity aspect ratio, the frequency spectrum required for transmission can be reduced by one-fourth, for a given vertical detail, and the screen area of the receiving tube, which is customarily of the cathode ray type, can be more efficiently utilized. A cathode ray image reproducing tube of smaller diameter thus becomes capable of reproducing the image containing a given amount of intelligence with substantially the same vertical detail as would a larger tube, and, of course, for airplane use, the smaller the installation the easier it is to use because of space limitations.

The usual space between successive film frames during the scanning of which, due to the lack of pictorial representations synchronizing signals may be transmitted, is provided by the areas or strips 17 on the film which separates the successive film frame areas.

It will be noted in connection with the angular position of each successive frame within the quadrant designated by the letter indicia at the ends of each strip 13 that successive numbers do not fall at the same point in the line between "N" and "W" but are progressively staggered. This is provided so that if more than one frame of the film is received at the receiver (irrespective of the directional type of transmission and reception) during each frame cycle the numbers corresponding to the received frames will not lie confusingly over each other but will be adjacent and easily read and the picture actually representing the direct path to the significant surface can be determined by the relative brilliance, for example, of the overlapping images. However, methods are also disclosed herein whereby because of directive transmission and reception only views corresponding to one angular position or direction are reproduced on the receiver screen. Further, it will be noted that where the numerical indications, such as 41°, 42° etc., are provided, these designations need not necessarily represent the angle from which the view was actually taken but should represent the field of view which would be seen were the actual significant surface 1 visible to the eye when an observer is approaching the significant surface from the angle designated. In other words, the designation 42°, for example, would mean that the observer of the received pattern corresponding to the film frame 11 was, in effect, looking at the field of significant surface 1 from a direction having a bearing of 42°, that is, 42° west of north for a counterclockwise increase in bearings. The same would be true also of the altitudinal indicia.

Now referring in more detail to the viewing method shown by Fig. 2 there is represented another method of accomplishing a result similar in general to that described by Fig. 1 in that a panoramic sequence of views of a significant surface 1 is taken by appropriately rotating the scanning device along the path indicated around the axis oo'. As is illustrated by the schematic arrangement of Fig. 2 the pick-up television camera 21 (or a motion picture camera) which may be of the same general character described in connection with Fig. 1, is mounted so that it can be swung in a succession of directions to scan or photograph the surface from different selected angular positions or bearings. The direction of rotation herein assumed is arbitrarily indicated by the arrow 25. In position A in which the camera 21 has been illustrated, for example, the field of view which would be scanned might, for example, be that field included within the solid angle "a".

With the scanning camera located at point 21 for example in position A on Fig. 2 and pointing toward the significant surface area 21', in the direction indicated, the view of the significant surface will be that view which corresponds to that which would be seen by an observer located at the significant surface from the point 21, provided the solid angle a indicates the field of view observed and the angle b indicates the altitudinal displacement or altitude angle of the observer relative to the significant surface 1. Under such circumstances, the optical axis of the scanner or camera 21, it will be seen, intersects the normal path o, o' from the center of the significant area 21' at a point m above the surface of the significant region. Accordingly, the field of view at the instantaneous azimuthal position will be that occupied between the bounding limits r, r'. Under such circumstances, it will be seen that the distance of the scanner or camera 21 relative to the significant surface 21' is considerable, and that the scanner or camera 21 when rotating in the direction indicated by the arrow to scan the significant surface from each azimuthal position (at fixed altitude throughout a 360° arc) will be such that the significant surface is covered (scanned) in an eccentric manner. For example, if it be assumed that the scanner or camera 21 has moved so that the azimuthal position is shifted through 180°, it is apparent that the field of view scanned on the significant surface 21' will change from that bounded on one side by r, r' to some area which is bounded for example, by points s, s', where o, r' equals o, s' and o, s equals o, r. While Fig. 2 shows three arbitrarily chosen distances of the scanner 21 from the significant surface so that each position of the scanner represents the same altitudinal displacement, it is apparent that the area of the significant surface 21' which is viewed by the camera in position A will be greater than for either of the other positions shown.

When the scanner or camera 21 is moved to a different position, such as B, so that the angle of altitudinal displacement 6' is equal to the altitudinal displacement b at position A, and the solid angle a' viewed by the scanner is identical to that viewed in position A but the distance of the scanner 21 from the significant surface at position B is less than in position A and the optical axis of the scanner or camera 21 intersects the significant surface at the point of intersection of the normal o, o' to the significant surface, then it will be apparent that the field of view seen by the camera will change to some area bounded by t, t'. This represents a condition for moderate distance viewing, and it will be seen that the significant region is scanned almost centrally, and rotation at fixed altitude of the scanner 21 in the arcuate path indicated will change very slightly, if at all, the bounding dimensions of the scanned area.

A third position possible for scanning the significant surface 21' where the scanner 21 is reasonably near the surface, but displaced at the same altitude, as was the scanner for positions A and B, has been indicated schematically by the scanner in position C. Under this condition, the optical axis of the scanner 21 intersects the line o, o', which is normal to the center of the significant region 21', at a point n which is below the significant region. Although the solid angle a" viewed by the scanner in 21 in position C is identical with the angle of viewing in positions A or B, and the altitudinal displacement b" is also identical with the altitudinal displacement of the scanner in positions A or B, it will be seen that the area of the significant region which is actually viewed by the camera may be bounded by points u, u', and is substantially less in dimension than either the area bounded on one side by the points r, r' (position A) or the points t, t' (position B). This view also covers the significant surface 21' in an eccentric manner (like view from position A) and in some instances, where the scanner 21 is still closer to the significant surface, will not even include the center of the surface. Furthermore, if the azimuthal position of the scanner 21 in position C is changed throughout 180°, it can readily be seen that the area included within the field of view will change to one which is bounded for example by the points w', w, where o, u equals o, w and o, u' equals o, w'.

For such conditions of scanning, it will be appreciated from what is to follow in connection with the description of Fig. 10 that the directional radiator of the developed image signals produced by scanning the significant area in any of positions A, B or C will always be pointed with the directional antenna or radiator displaced for maximum radiation altitudinally at an angle b, and that the azimuthal displacement of the antenna or radiator for transmitting the developed signals will change synchronously, and concurrently with the change in position of the scanner 21 instantaneously relative to an azimuthal datum direction in the significant surface 21'. As will be explained also in connection with the description of Fig. 10, provision may be made, were it desired, to vary the distance of the camera or scanner 21 from the significant surface 21', to accomplish this change in view size, merely by a shift of the camera along a path equivalent to those positions illustratively designated as A, B or C between the points y, y' on Fig. 2.

Without departing from the spirit of what has been described above it is possible to displace the optical axis of the scanner 21 transversely so that it never intersects the normal o, o', substantially centered upon the significant surface 21' and still produce satisfactory results resembling generally those above described.

To provide a single arrangement for three-dimensional scanning of the field of view or significant surface I, reference may be had to Figs. 3 and 4 describing and schematically illustrating two of a variety of ways for producing this character of transmission, and which are further described by Figs. 5 and 6.

In Fig. 3, reference numeral 39 represents the datum point or indicates the most generally important area of the field of view or significant surface I. To provide the record which is to be transmitted, the camera, which in this instance should usually but not necessarily be a motion picture camera 40, is arranged to make a motion picture record of the significant surface. The camera then is aimed throughout its traversal of the indicated significant surface along the indicated traversal paths at this datum point 39. The path of the camera 40 in covering the surface of the viewing hemisphere, that is, in scanning over or within a solid angle of 6.2832 steradians (or one hemisphere) in the case shown where no views are taken below a horizontal plane through the datum point (although under some circumstances the solid angle may be less than or exceed 6.2832 steradians, as above noted, but such solid angle is bounded by a circle which is smaller in diameter than a great circle of the sphere on which the solid angle is measured) is along a series of approximately great semi-circles 30—31—32 to 33—31—34 to 35—31—36, and then similarly to and along the path 37—38 etc. The angles subtended at the datum point 39 by the short arcs connecting the lower terminae of adjacent great semi-circles of scanning, for example, 30—34, 34—35, 32—33 etc. will usually be small and may, for convenience, be of a value varying between 12° and 1°, for example, as above suggested in connection with Fig. 1.

By the modification shown by Fig. 4, the camera 40 is still always assumed to be pointed at the same datum point 39 on the significant surface I within the field of view. However, in this instance, the camera is moved along an upward spiralling or helical path on the surface of a hemisphere 50, 52, 53, 51, 55, 54, 57, 56, 58 and then back inactively to 50, and this path is repeatedly traced in transmission. The arcs 50—53, 53—55, 55—57, etc. are short and may subtend a small angle which may be constant or variable as desired, for example. For convenience, the scanner or camera 40 is always directed at the datum point 39 of the hemisphere and, for each change in position of variance in the traversed arc path, a different pictorial representation or film frame representation of the significant surface will be transmitted. In this form of scanning it should be understood that the frame or repetition frequency of the transmission of substantially identical views determines the number of separate views per traversal of the complete scanning path relative to the significant surface, as indicated by the path 50, 52, 53, 51, 55, etc. However, as suggested for Fig. 3, this form of traced path may also cover a solid angle which is greater or less than 6.2832 steradians.

The effect obtained by moving through semigreat circle paths described in connection with Fig. 3 may be obtained also by maintaining the television camera 3 of Fig. 1 in fixed position, provided bi-directional or tri-directional model 21 (Fig. 5) of the significant surface 1 of Fig. 1 is supported upon a supporting platform which can be moved about two or more axes relative to the scanning camera. The model of the significant surface may be supported both for rotation in a horizontal plane about axis 22 of Fig. 5 and tilting or oscillation in a vertical plane about the axis 23 so that with simultaneously maintained tilting or oscillation and rotation in the inverse order to that described in connection with the scanning motion described by Fig. 3, the same angularly displaced views in both varying azimuthal and altitudinal scanning of the significant surface may be obtained. However, under these conditions, it is usually desirable, in contrast to the scanning of a film record of the significant surface from different positions, actually to scan the model of the significant surface in different positions relative to the scanner to produce directly the image signals which are to be transmitted. In the event that models of objects 43 (such as airplanes, hangars and the like) supported on the significant surface are changed in their location relative to any of the principal points or characterizing features of the significant surface, it is possible by providing models which would represent these objects to move the models from one place to another of the significant surface so that the scanning of the model on the significant surface represents the conditions of the surface as actually appearing at the instant of scanning. For the purpose of providing for making these changes, the small models which would represent the objects on the significant surface, such as instantaneous location of ships in a harbor or aircraft on the landing field or the hangars, it is possible either to have the significant surface formed as an electromagnet to hold iron models of the objects, for example, thereon or to provide on the base of the model of each assumed object a pin, for example, or other engaging or fastening device, which may hold the model of the object onto the model of the significant surface during scanning. Alternatively, the significant surface may be made of iron and the models of powerfully magnetic materials such as "Alnico."

In some instances a multiplicity of fixed scanners, sequentially brought into action by purely electrical or electromechanical commutation may be used to minimize or reduce the relative motions of the significant surface and the scanning means. This may be assembled in obvious manner and the successive scanners brought into action (i. e. usefully operative condition) at the rate of scanning one or more desired view areas.

By the arrangements shown by Figs. 5 and 6 provision has been made for scanning a model 21' of the significant surface (corresponding to the surface 1 of Figs. 3 and 4) in such a manner that the paths of scanning correspond, in Figs. 5 and 6 respectively, to the paths conventionally shown on Figs. 3 and 4. Reference is now made particularly to Fig. 5, which is intended to provide a viewing path or a scanning traversal path on the model of the significant surface in such a manner that azimuth changes slowly while altitude changes rapidly. It can be appreciated that the model 21' of the significant surface 1 may be supported for rotation about an axis 22 so as to be turned under the influence of the motor and the gearing in such manner that the surface turns through a complete 360° angle in a relatively long time period while it oscillates about the axis 23 rapidly (as in Fig. 3) compared to the rate of rotation. As shown, the significant surface 21 is adapted to rest upon the support member 25 and to be supported thereon by means of some suitable bearing members such as the roller bearings indicated at 22'. The film camera by which the motion picture or similar type film record is made of the significant surface, or the television camera 40 by which the surface is scanned for direct transmission, may be positioned in fixed location relative to the model of the significant surface in a normal position, that is, the position shown by Fig. 5. With the significant surface rotating about the axis 22 it will be appreciated that the relative motion obtained between the scanning camera and the surface different views of the significant surface will continually fall within the path of view of the scanning camera. In a case where the angle of vision of the scanning device includes the entire significant surface 21 and all objects 43 positioned thereon it is readily apparent that a 180° rotation of the significant surface about the axis 22 will merely change the position of objects from the left side of the scanning camera to the right side, for example. Those changes in the position of the surface 2 relative to the scanning camera 40 represent changes in bearing or azimuth when transmitted, and, consequently should be directionally transmitted (preferably) as hereinbefore suggested. Similarly, altitudinal changes would be portrayed by the tilt of the surface 21 about the axis 23 relative to the scanning camera 40. These changes are transmitted in a manner hereinafter also suggested, but which will later be described in further detail.

Illumination of the significant surface for the purpose of scanning may be provided by means of suitable lamps 20 arranged to direct light upon the significant surface 21 and preferably supported within the outer portion of the housing member 24. This method of illumination maintains the light sources out of the direct path or field of view of the scanning device. The lighting herein assumed may be that of an average and reasonably uniform character, although to represent a more directional lighting corresponding to that of a given time of day the intensity of the lights may be varied by controlling the lights 20 individually as necessary in order to maintain the desired shadow direction.

To accomplish this result it is evident that the lights may rotate or, as an alternative, synchronized commutation which is correlated with surface motion may be provided for the several lights.

By rotating significant surface 21' about the axis 22, it will be appreciated, for example, that the motion of the significant surface relative to the scanning device would be substantially equivalent to that path of motion shown as the camera path between points 32 and 33, or 34 and 35 of Fig. 3. The relative motion between the surface 21' and the camera 40 should preferably be slower than that motion which would be equivalent to that which would follow the path between point 33 and point 31 of Fig. 3, for example. As was above suggested this last named path of relative motion between the significant surface 21' and the scanning camera 40 is obtainable by oscillating the surface 21' about an axis 23 relative to the scanning camera so that the oscillation takes place about an axis which is normal to the axis about which the surface 21 is rotated. This, as above stated, represents different altitudinal scanning positions, and the effect may be provided, for instance, by any suitable form of drive means such as a motor (not shown) arranged to drive or oscillate the shaft 23 by any suitable means attached to the shaft 23. While it was above stated that the scanning mechanism of Fig. 5 would scan the significant surface from viewing positions substantially equivalent to the positions indicated along the several paths of Fig. 3, of course, as a practical matter this will not be exactly true. It is a substantially more simple matter to arrange the scanning system so that the significant surface 21' is continually rotating about the axis 22 at the same time that it is being tilted about the axis 23 in order that a start-stop mechanism may be avoided. Thus, if it is assumed that scanning is taking place according to a pattern of scanning substantially like that of Fig. 3, it will be appreciated that because of the fact the significant surface 21' is continually rotating about the axis 22 while the tilting motion to provided the path scanning upward from points 30, 33, 35, etc., as indicated by the arrows of Fig. 3, is taking place, the scanning path will be altered slightly from that indicated by Fig. 3. In its altered form the path instead of following a great circle path through the points 30, 31 and 32 and then abruptly changing the azimuthal angle between points 32 and 33 to thence follow path 33, 31, 34 and so on, the path of scanning will depart slightly from a great circle path and follow a curvilinear path from point 30 through the zenithal point 31 to a point approximately midway between points 32 and 33. Similarly, the next scanning path follows a curvilinear path from the point midway between points 32 and 33, through 31 to point 34 instead of following an exact great circle path. The scanning arrangement of Fig. 5 is so constituted that, as a practical matter, it provides for following a curvilinear path directly between points which are almost diametrically opposed. Thus slowly changing azimuthal scannings occur while the altitudinal changes in the scanning are occurring rapidly.

It is believed that the foregoing explanation will indicate clearly the exact manner of scanning the significant surface 21' with the device of Fig. 5 and will also indicate that as a practical matter the simplified scanning arrangement of Fig. 5 provides substantially all of the practical advantages of scanning along the paths of Fig. 3 although not actually following exactly such paths. The angular designations of the types shown by 13, 13', and 13" in Fig. 7 will be selected with due consideration to the scanning paths actually followed, as was described hereinbefore.

With the significant surface mounted loosely with respect to its housing member 24 the surface 21' may rotate about point 22 simultaneously with its oscillation about the shaft 23 through an angle of 180°. In this way the paths which are traced by the scanning device coincide substantially with the paths of traversal shown in Fig. 3. Any suitable arrangement may be used to oscillate the housing member 26 about its axis 23. For example, the motor may turn an eccentric to which is connected a connecting rod arranged to oscillate a sector shaped gear which, in turn, moves through a suitable connecting rod, a rack arranged to turn a meshing pinion gear attached to the shaft 23 to provide the desired oscillation. For simplicity of illustration this is not shown since it is a mere mechanized movement well known to all skilled in the art.

In the arrangement of Fig. 6, a still further modification takes place in that the path of travel coincides with that particularly exemplified by Fig. 4, so that changes in both azimuthal and altitudinal angles always occur simultaneously. In this instance the significant surface 21' also rotates about the shaft 22 and oscillates about the shaft 23. The rate of rotation about the shaft 22 is preferably relatively rapid as compared with the oscillation about the shaft 23. As oscillation of the surface 21 about the shaft 23 and rotation about the shaft 22 is taking place, the housing member 26, wherein the driving means for rotating the significant surface about the axis 22 is contained, is arranged to raise up toward the scanning device by means of the rack and pinion arrangement (conventionally illustrated) in order that the path of traversal of the scanning element relative to the significant surface shall substantially coincide with the path between point 50 and point 58 of Fig. 4.

Since the significant surface is oscillated about the shaft 23 provision is made for the housing for the rack member to oscillate simultaneously in a guide track during the time period when the rack is being moved upwardly from the position shown. A clutch member, which is arranged to be disengaged at the limit of upward motion, is indicated, although for simplicity, in the drawings, no means for disengaging the clutch has been illustrated. In this arrangement of Fig. 6, the azimuthal changes in scanning direction are relatively rapid and the altitudinal changes relatively slow.

With the arrangement of Fig. 6, it is, of course, desirable, in view of the fact that the housing member 26 used to support the driving motor which rotates the significant surface 21' about the axis 22 must be elevated in order to move the scanning member 40 in effect between points 50 and 58 (see Fig. 4) along the paths shown, that this same driving motor 28 also be arranged to provide the oscillatory motion of the significant surface 21' about the axis 23. Under such conditions the motor 28 may be arranged to drive and rotate an eccentric which, as described in connection with Fig. 5, in turn, moves a connecting rod back and forth to oscillate the sector shaped gear. The sector shaped gear is positioned and supported in such a manner that it meshes with a rack and the rack, in turn, drives a pinion secured to the shaft 23. It was above explained that the oscillatory motion of the significant surface about the axis 23 occurs at a relatively slow rate compared to the rate of rotation about the axis 22. Consequently, there is preferably provided on the shaft 23 a member which, when it reaches one extremity of its position corresponding, for example, to the maximum oscillation of substantially 90° of the housing 26 and the significant surface 21' along the paths 50, 53, 55, 57 and 58 of Fig. 4, will serve to disengage the clutch 30. Suitable provision should also be made for providing a dash-pot or the equivalent to prevent re-engagement of the clutch 30 until the significant surface has rotated through another complete revolution about the axis 22. The above construction has not been shown in detail in Fig. 6 of the drawings, since the plane of the gearing described is perpendicular to the plane of the paper and because of the fact that the arrangement described is only one of many which will provide the desired type of mechanical motion, and the invention per se being directed to the method of television and the method of transmitting signals is not predicated upon the selected choice of mechanical movement for accomplishing the desired results, all of which mechanical movements are well known to those skilled in the art and many of which are described in the publication hereinbelow referred to.

In view of the wide variation of nearest object distances from the objective lens of the television or film camera 40, resulting from the motion of the significant surface 21' in either Fig. 5 or Fig. 6, it is optically desirable that the camera lens shall be of short focus and wide angle and thus have maximum depth of focus or field. However, the camera may be focused automatically during the scanning by following the teachings of my Patent No. 1,924,277 dated August 29, 1933. It will be also appreciated that by providing an escapement mechanism which is capable of releasing the clutch 30 after a predetermined number of complete rotations of the significant surface 21' about the axis 22 and the provision of a suitable dash-pot, for example, for preventing the re-engagement of the clutch until one complete rotation of the significant surface about the axis 22 subsequent to its time of disengagement, the path of traversal may be caused to be almost exactly like that path indicated by Fig. 4. The illumination of the significant surface may be provided by arrangements which are, in general, similar to that shown by Fig. 5.

A modified form of arrangement wherein previously prepared views of a significant surface are to be transmitted has been shown by the schematic arrangement of Fig. 9b. The separate films shown by Fig. 9b represent different conditions of a significant surface and the various views and conditions may be obtained by photographing a replica or model of the surface according to the method shown by Figs. 2, 3, 4 or 5.

If, for example, it is desired to indicate that one of, say, three separate runways is available for landing an airplane at an airport that area or runway of the airport may be indicated illustratively in one condition of the model of the significant surface by a shaded area, in which event a film record or other suitable type of record will be formed in the manner shown for example by Fig. 1 and further illustrated by Fig. 10. Such a film record for example may comprise 30 separate views of the significant surface (assuming a television frame frequency of 30) and the chosen shaded area, where each view represents, under the assumed conditions, a 12° azimuthal separation from the preceding or succeeding view. Since with the assumed three runways provided for the airport it is possible to have several different combinations of conditions to provide for landing, namely, conditions where runway A is available for landing, where runways A and B are available, conditions where runways A and C are available, conditions where runways B and C are available and conditions where all runways are available, a different film record to represent each of these conditions may be prepared or it may be desirable to prepare only a record of each of the separate runways. These several films may be stored for use at desired time by placing them upon a rack suitable for transmission and then at selected times positioned individually or collectively, as above explained, in the scanning element.

Where only three films are prepared, and these are the general type shown by Fig. 9b, and each separate film indicates one of three runways, then it is apparent that any combination of available runways for landing may be produced and transmitted to incoming pilots by using any one or combining two or more of the separate films and matching them in spacial and angular position. In such event, the dark strip 74 on each of the film records 11 is matched with the adjacent film and the plurality of films are passed in unison before the television scanner 71 and the illuminating source 70. In this way it is unnecessary to provide film records indicating a plurality of runways available for landing since these are readily discernible from suitable combinations of the film strips indicating individual runways. Thus, all conditions for the assumed three runway field may be portrayed by providing film strips, such as are indicated by Fig. 9b, which vary in number between three and seven and transmitting the indications thereon individually or in groupings.

An alternative to the arrangement for scanning hereinabove described may be found by referring, for example, to Fig. 10 by the arrangement of which it is possible to scan through a sequence of changing azimuthal positions but fixed altitudinal location with both the scanning instrumentality and the significant surface fixed. For accomplishing this purpose there is interposed between the scanning instrumentality and the fixed significant surface a suitable form of optical means. The optical means may preferably consist of reflecting surfaces 50' and 52' as mirrors, prisms or optical wedges, or the equivalent, positioned and supported upon a support carrier. The mirrors 50' and 52' are tilted with respect to each other and with respect to the fixed significant surface 21' and the fixed scanner 40 in such a manner that the light reflected from the significant surface 21' to the first mirror 50' may be assumed to follow the path $m$ to the first mirror from which this light is reflected onto the second mirror along the path $n$ and, in turn, reflected into the scanning tube along a path $p$.

It will be noted, for instance, that the mirror 52' which directs the reflected light to the fixed scanner 40 is positioned substantially at 45° to the normal path of the light falling into the fixed scanner along path $p$ while the second mirror 50' which receives the light reflected from the significant surface 21' is positioned at such an angle with respect to the significant surface and to the second reflecting mirror 52' that the angle of reflection of the light shall be substantially equal to the angle of incidence and yet so positioned that the path of reflected light from the first mirror 50' shall be substantially at 45° to the plane of the second mirror 52'. Obviously any equivalent optical means may be used and fall within the scope of this invention.

The light 64 may be so positioned centrally to the significant surface 21' as to simulate average lighting; or it may be slidably and/or eccentrically positioned to be fixed in desired locations to simulate specific lighting conditions (e. g. of late afternoon). In order to provide for the scanning of the significant surface the support element 62 for carrying the mirrors reflecting the light directed upon the significant surface 21' from the source 64 to the fixed surface may be rotated by a suitable prime mover at a rate corresponding to the rate at which any one of the angularly displaced views is repeated so that in the time interval intervening all of the other desired angularly displaced views of the significant surface have been scanned. Where desired, however, and particularly where electronic scanning systems are utilized, the carrier or support means for the mirrors may be held stationary during the scanning period or the period of illumination of the scanning device by the light reflected from the significant surface and moved intermittently in the time interval between successive scannings.

If, for instance, it is desired that the several views shall represent different angular or azimuthal displacements of the scanning means relative to the significant surface, then the scanning element or the mosiac thereof may be illuminated during the return time period for the scanning beam during the scanning of each frame of the significant surface and the illuminating bodies held stationary during this time period. As soon as the mosaic of the scanning device has been illuminated then a suitable shutter arrangement, not shown, interposed in the path of light reflected from the significant surface to the first mirror and masking the optical system for directing this light may close over the optical system and obscure the reflected light from the significant surface to the scanning device and the carrier for the mirrors moved intermittent to the next position of scanning. This intermittent motion may be accomplished by any suitable form of intermittent drive for this purpose, as hereinbefore suggested. Various types of motions of this nature, as well as other mechanical motions previously mentioned herein, have been fully disclosed in the book "Ingenious Mechanisms for Designers and Inventors," vol. 1, by Frederick Jones, published by Industrial Press, New York, 1935. Likewise, the method of scanning by which the mosaic of the scanning device is illuminated during periods of return of the scanning beam and maintained, under the control of the character above referred to, in darkness during periods of actual scansion has been fully disclosed in the patent to Ray D. Kell, Number 2,166,214, issued July 18, 1939.

In connection with the forms by which the invention has been shown in Figs. 3 and 4 and further exemplified by Figs. 5 and 6 it should be understood that for portraying altitudinal angles relatively close to ground elevation the separation between or, in other words, the angular separation of the successive views should preferably (though not necessarily) be less than for angular positions closer to the zenith point. Thus, with the model of the significant surface shown by Figs. 3 and/or 5 moving along a path (as hereinbefore mentioned) closely approximating that from point 30 toward the zenith point 31 and then from zenith point 31 toward point 32 (as in Fig. 3) the angular separation between successive pictures should be relatively small near the plane of the centralmost point 39 and the starting point 30 with increasing angle between successive views as the zenith point 31 is approached. Similarly, after passing beyond the point along the curvilinear path coming nearest to the zenithal point 31 toward point 32 (or point 33) for example, the angular separation between successive views on the semi-circle path 31, 32 or 33, for example, becomes less and less until close to the point 32 or 33. The angles subtended by each separate picture representation coincide with those taken along the path from point 30 to that point nearest the zenithal point 31. Similar conditions, of course, obtain with respect to all other semi-circular or semi-hemispherical paths, or the chosen curvilinear paths. This procedure more nearly divides the total solid viewing angle into equal or equally useful portions for successive scannings and may be controlled by suitably controlling the rate at which the housing oscillates on shaft 23.' The angle designations comprised in each view transmission must of course be selected in accordance with the preceding.

In the modification shown by Figs. 4 and 6 where the path traced from 50, 52, 53, 51 to the zenith point 58, the pitch of the spiral or helical path (i. e., changes in angle of altitude) may be less nearer the significant surface so that, for example, in passing between point 52 and 51, the altitudinal angle might be of the order of 6° elevation with respect to the central point 39, whereas when point 54 is reached there might be, for example, a 12° altitudinal separation along the semi-circular path 52, 54, 56, 58 subtended between points 51 and 54 and then, for example, between point 54 and point 56 a 24° altitudinal angle relative to the centralmost point 39 on the significant surface might be subtended and the next spiral paths might be of similar angular separation until the view of the significant surface from the zenithal point is projected. Following this spiral path, as above suggested, a picture might be taken at every 12° separation so that in moving from point 50 through 52 and reaching point 53, 30 distinct pictorial representations of the conditions on the significant surface would be obtained. If now 5 spiral paths are assumed before the zenith point 58 is reached and the angular separation between successive views along the spiral paths remain the same, it can be appreciated that there will be produced 150 separate pictorial representations of the significant surface taken both from different azimuthal angles and from different altitudes or elevational indications. Those scannings are to be transmitted preferably in a directional manner with respect to both azimuth and altitude, in a manner which will herein be explained more fully in connection with the actual transmission and reception of the developed signals.

In order then that any one of the selected conditions or representations may be represented at the receiving point, it will be appreciated that if 30 complete pictures are transmitted each second that the viewing screen should be one in which a substantial time lag is present. Under such conditions, it is obvious that one satisfactory type of viewing screen will be one having a luminescent material whose time lag is of the order of five seconds, that is, one whose time lag substantially coincides with or even somewhat exceeds the time separation between representations of the same identical view of the significant surface.

When the film record, which may be of the character shown more particularly by Figs. 7 or 9b, has been produced to represent the selected azimuthal and/or altitudinal viewings of the significant area, and it is desired to transmit this record automatically, the produced film record is positioned in a suitable form of motion picture projector device in such manner as to pass before the scanning instrumentality at the desired rate. The scanning instrumentality, as was above suggested, may comprise an electronic image scanning tube of either the storage or the non-storage type, or, where desired, the scanning instrumentality may be in the form of a disk element having arranged about the periphery thereof a spiral series of pictures in cases where an intermittent drive for the film projector is provided or a series of circularly arranged apertures where a continuously moving film projector is provided.

In accordance with the showing in Fig. 8 the storage type electronic scanning device will be assumed, and therefore it is preferable in this connection to utilize a suitably arranged form of intermittent or continuous film projector device. Such a form of film projector device may, in instances where it is desired to interlace the received picture, be of any desired form of that type of device described in Patent number 2,166,214, issued to R. D. Kell on July 18, 1939 and/or the Patent No. 2,082,093 granted to A. V. Bedford on June 1, 1937 is suitable, or, where it is not desired or necessary to interlace the received picture, the film scanning device may be of a more simplified nature, such as one of the general type shown and described by British Patent No. 297,078, complete accepted June 19, 1929.

In connection with the transmission of the type to be hereunder described, the film record 11 is shown as including the exact number of frames required to cover 360° of the scanning of the significant surface with the desired azimuthal and/or altitudinal separation of the several views of this significant surface. Therefore, the film may be arranged conveniently in a loop, as shown, and may feed through the intermittent or other feed mechanism of the motion picture projector in the same manner as if the film were being unwound from a reel and rewound upon a take-up reel subsequent to projection.

For reasons which will be obvious from what has been stated above it is desirable, in view of the fact that most efficient operation is so directly related to directional characteristics of transmission, that the scanning mechanism (for film transmission or for direct pick-up) shall scan in such manner that the instantaneous angle of transmission shall coincide with the angle of view to be transmitted at the instant. Suitable interconnection means, as herein described, are therefore provided between the film scanner and the directional transmitter.

With the arrangement shown by Fig. 8 the film is preferably illuminated during scanning by a suitable light source 70. The light from this source is projected through a suitable optical system (not shown) into the transmitter scanning device 71 whose output is connected by way of conductor 72 to an amplifier 73. On the film is usually a band or mark 74 used to indicate a certain particular line of bearing or azimuth, for example, zero degrees north, or, where desired a certain altitude. Thus, when the film is run it is possible to align the directional transmitter with this portion of the film in order that the transmission shall take place in the desired angular relationship, as will herein be explained further.

The film is generally arranged to move in the direction shown by the arrow and is driven by means of any desired form of film advance arrangement which has been illustrated, for example, conventionally by the motor drive 75 through the shaft 76 and the film drive sprocket 77. Since this drive means for the film may readily serve also as a prime mover arrangement for rotating as well the directional transmitter antenna, conventionally shown at 79, this antenna may be arranged to be rotated about an axis 80 by way of the drive shaft 81 through suitable gearing, for example, (not shown) where the transmission varies merely in azimuth but the altitude remains constant. Thus, if the strip 74 on the film 11 indicates the line of zero bearing in a direction pointing north, then the transmitter antenna (or the therewith associated means for controlling the direction of transmission) will also be positioned so that it transmits in the correct direction to give the proper viewed image at receiving points. In a form of system wherein azimuthal changes only are radiated (and the altitude remains constant) the gearing arrangement between the drive for rotating the directional antenna and advancing the film is such that whenever the rotatable directional transmitting antenna 79 turns through 360° around a vertical axis, the film will have advanced also through a complete loop so that the indicating strip 74 is carried back to its starting position relative to the transmitting scanning tube 71, as shown, for example, by Fig. 8.

When signals representative of the scanned area are developed from the transmitting scanning tube (the general character of which has been herein described and shown only schematically) of Fig. 8, these signals appear in the output of an amplifier 73 which is of any conventional form and designed to pass a relatively wide band of frequencies without distortion. Such amplifiers, per se, are well known in the art and, therefore, have not been specifically disclosed herein, although reference may be made to the patents of J. P. Smith and A. C. Stocker, Nos. 2,045,315 and 2,045,316, respectively, as well as many other related prior art devices, for a form of suitable amplifying arrangement. It will thus be understood that the present invention is in no way predicated upon any specific form of amplifier, so that a mere conventional form is suggested.

In order to synchronize any of the receiving devices for receiving the image signals transmitted from the directional transmitting antenna 79, oscillators 89 and 90 are shown as connecting both with the transmitters 91 and 92 of which the former serves to supply energy to the directional transmitting antenna 79 by way of the conductors 86 and the latter of which serves to transmit energy by way of the conductor 93 to the non-directional transmitting antenna 87.

As will be described more particularly in connection with Figs. 11 and 12, the transmitting antenna 79 for the arrangement of Fig. 8 should preferably be a directional doublet with an appropriately mounted reflector means to confine the radiation directionally to preselected altitudinal and/or azimuthal radiation directions. Such reflectors may consist of merely a single rod of appropriate length (preferably just slightly longer than the summation of the two dipole section lengths) which will be positioned behind the dipole and opposite from the direction of radiation so that the line joining the center of the reflector and the center of the dipole will point in the direction of maximum radiation. Also, it is possible to use as a reflector, as will herein be described, an elongated reflector element of a length slightly greater than the combined length of the dipole sections and which is curved or formed as a surface of revolution with the dipole substantially at a focus.

As still another alternative, it is possible to have the reflector formed as a cylindrical surface, the cross-sections of which cylindrical surface in planes perpendicular to its axis being for example arcs of circles or a parabola. Furthermore, other modified forms of reflector elements are capable of use not only with the arrangement shown by Fig. 8, but also with any other form of transmitter or receiver and among such forms are those which are known in the art as the "Yagi" reflector which has been described particularly.

All of these forms of reflector elements are substantially interchangeable one with the other and substitution of the various forms may readily be made with a gain in altitudinal and azimuthal directivity of the radiator in some instances, or with slight losses in other instances, depending upon the nature of the selection. The output of the amplifier 73 transmits both the video or picture signal and the background signal which is developed from the scanning tube 71. If desired, a sound signal may also be transmitted thereby, as suggested in effect by Zworykin in "Proceedings of the Institute of Radio Engineers" for December, 1933 (vol. 21, No. 12) pages 1655 et seq. However, in contrast to the usual form of transmitting system, the synchronizing signals are not transmitted as a general rule to accompany the video signals transmitted from the directional antenna but rather are directed from the omni-directional antenna 87 (from which sound signals can also be sent if desired, as above suggested). The connection of the oscillators 89 and 90 into the transmitter 91, as shown, serves to bias to cut-off the transmitter 91 during at least a portion of the time period when synchronizing signals are to be transmitted in order that only uni-directional type of transmission shall be the picture signals accompanied by the background signals. Further, where the signals are so interrupted it is more easily possible to relate the transmission to the more used type which requires (in cathode ray receiver types) a certain time period to permit the scanning beam to return to a starting position after scanning each picture line, frame or field. The interruption (or "blanking") period allows for this time period. The synchronizing signals then may be transmitted coincidently with the interruption (or even during transmission of picture signals) if they are sent up separately from the non-directional transmitting antenna, and accompanying the synchronizing signal there may also be a constant background control signal corresponding to a dim or dark background where desired. The desired backgroud signals may be developed as shown for example by Beverage Patent No. 2,081,730 granted May 25, 1937.

The system of providing the transmission of the synchronizing and picture or video signals is a convenience in order that all receiving points may be properly synchronized with the transmission irrespective of whether or not they fall within the range of reception of the directionally transmitted signals but, if desired, all signals may be transmitted from the uni-directional antenna 79 without departing from the spirit and scope of the invention.

The transmitter antenna arrangements, permitting the desired directivity of transmission, are obtainable by methods known in the art. Thus, directional antennas or arrays can be physically rotated as a unit to change the direction of transmission of the admitted signals. Alternatively fixed directional antennas or arrays can be used, and these may be fed through electrical systems wherein are included rotatable, switchable, or adjustable means for controlling the resulting direction of transmission. The rotatable means may be either mechanically rotatable (as, for example, variable inductive couplings); or they may be electrically rotatable. Electric rotations may involve the use of two-phase or multi-phase control currents rendering active or inactive amplifiers through which the output energy of the transmitter passes sequentially to various portions of directional antennas or arrays in such fashion as to systematically and cyclically change the direction of the transmission.

As an alternative form of transmission where the background, or in other words, a generalized view of the significant surface remains constant for any fixed locality but the position of objects on the significant surface are continually changing, provision may be made for the transmission as a background of views of the significant surface taken from desired angles; and as changes in the foreground action or, in other words, position of objects on the significant surface occur, these signals may be transmitted as a separate foreground signal. The general method of transmitting television image signals with separate backgrounds and foregrounds has already been described and claimed in Goldsmith Patent No. 2,073,370 and in many instances a system of this general nature is highly desirable for use in connection with the transmission system of the character herein described, since it is possible by merely arranging objects on a surface bearing a direct proportionality to the area of the significant surface to change the position of such objects readily. It is also possible to have produced once and for all a film record, for example, of the significant surface lacking all such objects. In accordance with the teachings of the aforesaid Goldsmith patent, when separate scannings occur, one being for background (that is, in the instance of this disclosure a view of the significant surface), and the other being for foreground (that is, the changing position of objects upon the significant surface), it is possible to provide the effect of transmission which would have resulted had the significant surface been accurately scanned with such objects correctly located thereupon. This is due to the use of a control of the background scanned by the blanking signals resulting from such scanning whenever a signal representing the foreground area occurs. As an alternative, these scannings of the background and foreground areas may take place by substituting, as shown by Fig. 9, for the separate foreground and background, areas of optically or mechanically fixed, movable, or rotatable slides interposed between the film 11 representing the significant surface of the scanning instrumentality some showing of the temporary or mobile additions to the basic scene so that both the significant surface and additions thereto are transmitted as a unit. This is an optical superimposition, as contrasted with the previously discussed electrical superimposition or mixing.

In connection with the transmission of signals produced by scanning, when the various systems herein described are utilized, it is, of course, possible that the actual transmission may be of various forms. According to one species, the transmission may be provided in such a manner as to be substantially non-directional in altitude at all times but variable (cyclical) directionally in azimuth. Further, the transmission should preferably be such that radiation is in the opposite azimuthal direction to the direction of scanning of the original significant surface regardless of what type of scanning system herein suggested is employed, i. e., central outward or peripheral inward.

It is, of course, apparent from what has hereinbefore been described that in some forms of the invention it is desirable to provide a form of transmission so controlled that the transmission is cyclically variable both altitudinally and directionally in azimuth. In cases where there is no altitudinal variation in the transmitted directional path of the radiated signal energy, it is usually preferable to provide that the altitudinal angle of transmission (where the altitudinal transmission is directional) shall be maintained substantially constant. This altitudinal transmission is preferably maintained at an angle which might represent, for instance, the assumed normal glide angle to the significant surface, where the system is utilized in connection with the transmission of signal energy to airplanes. Without intending to limit in any way the exact angle at which the altitudinal indications shall be directionally transmitted, it will be understood that such angle usually will not exceed an upward angle of 5 degrees from horizontal, although, naturally, where the glide is to take place over a steeper angle or a smaller angle, this altitudinal displacement may also be varied. It will be explained herein how this altitudinal displacement when carried on in a directional path of radiation can be utilized to indicate on the receiving system whether or not the plane is actually following a normal glide (herein "normal" must be determined as the selected optimum altitudinal displacement of the transmitter) or whether the angle becomes too high or too low relative to the selected optimum altitudinal angle.

In the forms of transmitting arrangements shown, for example by Fig. 11, the antenna preferably comprises merely a horizontal doublet 301 which is connected to the transmitter 303 to receive the signal energy to be radiated. This antenna is physically rotated about a vertical axis 305 at an appropriate speed to correspond to the speed at which the changes in azimuthal scanning of the significant area take place. Such an antenna may, where desired, be provided with a reflector 307 to improve the azimuthal directivity. However, this is not essential, although desirable to confine the radiation only to the forward azimuth, for example. Such an antenna, of course, does not inherently provide markedly and rapidly variable directional transmission in altitude and thus, there is no direct relation between the altitude of the receiving station (as measured by the altitude of a vector from the transmitting station through the receiving station) on the one hand, and the views of the significant surface which are received, on the other hand. However, this system does provide directional radiation in azimuth, and for simplicity of installation can conveniently be adopted where no special concern is given to altitudinal displacement.

In the form of arrangement of the antenna thus described, energy from or to the transmitter system is supplied to the antenna through any desired form of connection such, for example, as slip rings 309, which are connected to the rotating antenna. The antenna is preferably rotated so that the same cyclic variation is provided for it as is provided, for example, with the rotary scanning systems shown by Figs. 5, 6, 8, 10 or 9B. The antenna installation under such circumstances is preferably mounted upon a support base 311 similar in all respects to the significant surface 21' as supported from the support member 26 in Fig. 5. So arranged, the models 43 carried upon the base of the significant surface 21' of Fig. 5 are removed, as is the housing member 24 and its associated components, as well as the scanning camera 40. This provides an arrangement whereby the support member 311 carrying the antenna 301 or radiator is such that there is a direct path outward from the support base to provide for unobstructed radiation. Where no altitudinal variation in transmission is provided, the oscillatory motion of the support base 311, as provided for by oscillation about the axis 306, may be stopped by the disengagement of a clutch member (not shown) and rotary motion about the axis 305 is provided by means of the motor 303 and gearing 315 indicated. In systems of this nature the motors to drive or rotate the significant surface 311 like Fig. 5 (for example) and a like character surface for supporting the antenna, may be synchronous motors. It is also desirable that there be provided on the rotating table a support member 311 as a datum or starting point indication 317 so that both rotary devices rotate in synchronism. As an alternative, Selsyn or equivalent master and follower motors may be provided and the initial starting position similarly established by setting each turntable at the predetermined datum or reference point prior to commencement of actual rotation and transmission.

For simplicity of installation, it is desirable that the rotating elements shall be linked one with the other so as to assure synchronous driving at all times. Various electrical or mechanical linkages may readily be provided and thus are not shown because of their obvious nature.

In a modification of the arrangement where particular reference is given to provide for radiation obliquely upward at a substantially fixed altitudinal displacement, a reflector arrangement 321 such as that shown, for example, by Fig. 12 may be provided in combination with the doublet 301 and the reflector 321 then may be set so as to confine primarily the altitudinal transmission to the desired angle. With such an arrangement it is, of course, apparent that the maximum signal strength is radiated at the desired or selected altitudinal displacement although the changes in azimuthal radiation occur in the same manner as was hereinabove explained. So provided, the general arrangement of Fig. 11 is adaptable to use for fixed altitudinal signal radiation when it is borne in mind that the oscillatory motion normally taking place about the axis 306 is eliminated, for example, by disconnecting the shaft 306 from the motor drive 313 by means of a suitable clutch arrangement (not shown).

With this form of radiation it is, of couse, apparent that an extremely compact construction and antenna control has been provided which will give an average altitude, (for example, the glide angle) picture of the landing field or significant surface but not that view corresponding to the actual angle of the televisible view nearest that along which the airplane happens to be approaching the significant surface at its selected glide angle. This modification has the decided advantage over the antenna arrangement of Fig. 11 in that the radiated beam is now more highly directional and the likelihood of misinterpretation of the meaning of the viewed field lessened. In many instances, for instance, it is desirable and especially so where the scanning beams, suggested for example by Figs. 3 and 4, are used so that the transmission is substantially mono-directional and cyclically and systematically varied in both azimuth and altitude to provide a transmission system of increased fidelity. In this form of arrangement a transmitter is highly directional and while rotating to provide azimuthal changes, is also oscillated to provide altitudinal changes. The transmitter reflector obviously may also be formed as a paraboloid of revolution, as suggested in connection with the receiver. This provides increased directivity altitudinally and azimuthally.

As a general proposition it should be understood that any of the scanning arrangements, such as those particularly exemplified by Figs. 5, 6 and 10, are applicable to use with the transmitting antenna and when synchronized the direction of radiation of signals inherently coincides with the direction of original view scanning. In systems where a film record of the significant surface has first been produced and is then scanned as schematically exemplified by Figs. 8 or 9B, the directional paths of radiation may be obtained as indicated by Fig. 8 (here fixed altitude is assumed) by one rotation of the antenna assumed to correspond to the time elapsing for one complete scanning of the film 76. Where the film 76, however, includes changing altitudial views, as well as changing the azimuthal views, it is of course apparent that the directional transmitter antenna may be required to turn substantially more than 360 degrees azimuthally (as in the trace or path suggested by Fig. 4) prior to the time that the complete film is scanned. Consequently, the rotating antenna 301 may be supported upon a supporting means 311 like shown by Fig. 11 which is of a nature closely related to the scanning systems of Fig. 5 or 6 and where the drive motor for rotating and oscillating the antenna is so controlled as to speed that it turns the antenna about axis 305 and oscillates it about axis 306 in such a manner that it is moved through a predetermined number of azimuthal degrees as well as altitudinal degrees during a complete transmission period for the film to return to the starting position at the time the connecting strip 74 of the film 76 comes before the scanner, it will be appreciated that the desired form of transmission has been provided. No illustration of this form of control has been made inasmuch as it is perfectly obvious that the gear ratio and motor speeds may be readily calculated where the number of azimuthal degrees about which the antenna must be rotated is given and it is known how many complete rotations must be made for one film loop to provide the necessary or desirable changes in altitude of the transmission.

At the points of reception, arrangements must be provided for maintaining the receiver scanning in perfect synchronism with the transmission both as to the rate at which line and picture repetition occur. But provision must also be made, if the device herein disclosed is to be used to indicate to a maximum degree of efficiency the line of bearing (azimuth) and/or altitude of the picture signals transmitted, to render the receiving instrumentalities operative substantially only at the time when the azimuth and/or altitude (or azimuth only) corresponds with some predetermined condition or position of the uni-directional transmitting means. Accordingly, the arrangement shown, by example, by Fig. 17 provides a system of control for rendering the receivers operative at the desired time and for shifting in time the point at which the receivers become operative when the directional antenna of the receiving instrumentality is pointed so as to receive the maximum intensity signal.

The signals transmitted from the transmitter arrangements are, where desired, picked up upon a non-directional receiving antenna 100 as shown by Fig. 13 upon which the various directionally transmitted video signals and the non-directional transmitted synchronizing and, if desired, the background signals are received. The non-directional receiving antenna 100 of the receiver of Fig. 13 is arranged in known manner to pick up all of these signals and when these signals are so received, they may be fed to a receiving system 102 of the general character shown, for example, by Carlson Patent Re. 20,700 wherein the video and synchronizing signals are separated and wherein the resultant rectified video signals are caused to control the intensity of the light spots produced upon the viewing screen of the cathode ray receiver tube 104 and the synchronizing signals, as selected and separated as to the line and frame synchronizing impulses, control the point in space where the electro-optical reproduction or light spot instantaneously occurs.

In a modified form of the arrangement, as shown by Fig. 14, the non-directionally transmitted synchronizing (that is, both line and frame synchronizing) signals and, if desired, the background signals are received upon a non-directional antenna 101 and after being suitably amplified in an amplifier 103 are fed to a receiver or combining device 105 similar to the receiver 102 of Fig. 13. Similarly, the directionally transmitted video signals are picked up upon a loop or other directional receiver (schematically represented by 106) which is capable of being rotated in any direction to a position such that the loop, for example, is in alignment with the directional transmitter for a maximum signal response. Assuming the loop to be in alignment with the directional transmitter for transmitting the video signals, the angular displacement of the loop from a normal position can be readily ascertained through an indicator (not shown) of the amount of rotation required to pick up a maximum strength signal. When the signals are thus received upon the receiving loop antenna 106 these signals are suitably amplified in the amplifier 107 which has substantially flat characteristics throughout a wide band of frequencies as above explained and shown by Patents 2,045,315 and 2,045,316. The output signals of amplifier 107 are then fed to the receiver device 105 along with the received and amplified line and frame synchronizing signals and where desired, background signals.

The receiver system per se, as shown by Fig. 14, insofar as concerns the separation of the video signals from the line and frame signals is substantially like that shown by Fig. 13 and in accordance with the arrangements suggested in the aforementioned Carlson Patent Re. 20,700. Accordingly, the reproduction of the video signals upon the viewing screen of the observation tube 104 occurs in the manner above explained in connection with Fig. 13.

Simplified forms of substantially mono-directional receivers are schematically shown by each of Figs. 18 and 19. Such forms of arrangements wherein the receiver antenna consists preferably of a dipole 401 which is adapted to feed the received energy into the receiver 107 are generally known in the art. The dipole 401 of Fig. 18 is backed by a reflector 421 generally similar to the reflector 321 of Fig. 12. The arrangement of the dipole 401 and the reflector 421 is suitably separated and mounted in such manner as to be capable of rotation about the axis 403 to provide for normal reception of signals of maximum strength along a predetermined azimuthal path. Likewise, the reflector 421 is also capable of rotation about an axis 405 to provide selected altitudinal reception at a predetermined angle. Preferably, there are provided through associated linking means indicating dials to indicate the degree of rotation of the reflector 421 and/or the dipole 401 to each of the axes 403 and 405 in order that the observer of the image produced upon the image reproducer tube 104 may know and appreciate the true significance of the maximum intensity image in accordance with the orientation either azimuthal or altitudinal of the dipole and its reflector. There is preferably also provided in conjunction with the dipole 401 and its reflector 421, a nondirectional receiver (not here shown) such as was illustrated in connection with Fig. 14. Such nondirectional receiver, like in the showing of Fig. 14, is primarily for the purpose of receiving synchronizing signals and/or background signals and/or the associated sound signals.

In the modification of Fig. 19, the dipole 401' is likewise backed by a reflector 421' formed as a suitable (e. g., parabolic or spherical) surface of revolution with the dipole 401' located substantially at its principal focus. Otherwise, the modification of Fig. 19 is substantially like that described in connection with the directional receiver of Figs. 14 and 18.

Although physically oriented and mobile directional receiving antennas have been illustratively described herein, it is to be understood that any appropriate electrical, mechanical, or electro-mechanical means of systematically varying the direction of best (maximum) reception of the receiving antenna may be used. These means include the methods described above in connection with directional transmitting antennas following the description of Fig. 8 but modified for receiving purposes according to methods well known in the art.

Referring now to Fig. 17 for an understanding of a modification of the receiver, an arrangement has been shown which provides that only one of a plurality of transmitted frames or views of the significant surface shall be received in accordance with the position of the loop and the other signals directionally transmitted and received. It can readily be appreciated that even though directional transmission occurs, it is desirable to receive only one of a plurality of transmitted views representing different angular directions of viewing the significant surface for each sequence of transmissions and, accordingly, with the arrangement of Fig. 17 provisions have been made for carrying out this purpose or at least confining any prominent visual representation to a single field of view. In considering Fig. 17, it should be assumed that this arrangement provides means for producing electro-optical images each of a 1/30 second time duration and with such production in phase with the peak of the received carrier wave from the panoramic directional transmitter described in connection with Fig. 8, for example, whenever 30 complete views of the significant surface are being transmitted each second. So considered, the video frequency modulated carrier wave as received upon the directional antenna shown by any of Figs. 14, 18 or 19 after being received, is suitably amplified in a radio frequency amplifier 110 and then rectified and, if desired, limited in rectifier 112 so that only peaks of energy of greater than a predetermined amplitude pass beyond the rectifier, after which these signals are passed through a high pass filter 114 which passes all frame frequencies beyond 29 cycles, or other frequency suitably less than 30 cycles, for example, and cuts off for example below 29 cycles (assuming transmission is at 30 picture frames per second). The output of 114 is amplified and used to produce a removal of a cut-off bias applied to amplifier 118, as further explained below. Thus, the frame pictures lying one frame either side of the desired frame to be viewed will not be received on the screen of the cathode ray reproducing tube 104 because of the directional characteristics of the transmitter and the fact that the directional antenna 106 of the receiver when aligned with a receiving device will not be capable of receiving a signal whose amplitude is insufficient to exceed the limiting value of the limiter arrangement provided as a part of the rectifier. Similarly, the video signals as received upon the directional antenna are directed through a receiver amplifier 118 of the general character explained in connection with Figs. 13 and 14 or 18 and 19 so as to cause the production of electro-optical images upon the viewing tube. The control of the electro-optical image production, however, is provided in accordance with the output from the high pass filter 114 being suitably amplified and serving to operate a biasing cut-off amplifier 122. The biasing cut-off amplifier 122 has its output connected to the video frequency amplifier 118 of the receiver device connected to supply its output energy to the control electrode of the cathode ray image reproducing tube 104 for reproducing the electro-optical image effects and serves normally to bias the image reproducing tube to cut-off value unless the loop supplying its energy to the radio frequency amplifier 110 and the rectifier 112 and the high pass filter 114 is positioned according to such a line of bearing that the desired 30 cycle frame repetition frequency occurs, in which event the output signal from the audio frequency amplifier connected with the output of the high pass filter serves to remove, through the bias cut-off amplifier, the bias applied to the video frequency amplifier and thus permits the production of the electro-optical images at the desired time period. It can be appreciated that with the arrangement shown in Fig. 17 a signal is produced with maximum intensity of substantially the full 1/30 second period of the desired pictorial representation. However, if it is now assumed that the directional loop of the receiver is turned exactly midway between two positions of maximum signal strength radiated from the directional transmitting antenna then it can be appreciated that there will be received two signals each of intermediate brilliance and for which the receiving loop will be unable to distinguish and both of which signals will likely exceed the amplitude for cut-off of the limiter arrangement associated with the high pass filter. In such event, the bias may not be removed from the image reproducing tube 104 except after a duration of approximately 1/15 second, and there may then be reproduced on the image screen of the reproducing tube two overlapped pictures each somewhat fainter than the desired picture and of substantially the same total brilliance as the desired picture when the light intensities of each separate picture are added. Such a picture for example would be of the general character shown by Fig. 15 wherefor the north to west quadrant, the letters N and W, which stand out sharply the image in the field of view would appear as two separate images each not greatly unlike, and for example if the loop were pointed 42° north to west, both the designations 36° and 48° would appear on the bottom of the picture (since pictures are transmitted for each 12° illustratively). However, if now the loop is turned for example in the direction of west, a brighter picture will appear and the designation 36° and its accompanying image will disappear completely with increased brightness of the 48° designation and its accompanying image taking place. Accordingly, the navigator at once knows that the directional loop is pointed at some particular transmitting point and that the directional transmitter has been turned through on an angle of 48° from west of north, and hence by guiding the aircraft or the like it is possible to follow the line of bearing and to repeat continuously the reproduction of the desired view. The angle between the direction of flight and the direction of the oriented loops can of course be read directly on the plane.

A useful, but not essential adjunct device to indicate the direction of the incoming signals and the operating condition of the system is shown in Fig. 16. The receiver 131 is connected through conductor 130 to a non-directional antenna which picks up the frame synchronizing signals (assumed to be 30 per second). The suitable amplifier which provides the output of receiver 131, and is a part thereof, then feeds, through conductor 132, the synchronous motor 129 causing it to rotate once per second, thus synchronously driving the lamp 125 at the same rate through shaft 128. This lamp may be, for example, a usual neon discharge tube. The receiver 121 is connected through conductor 120 to a directional antenna, preferably rotatable by the radio operator. The output of the receiver 121 is adjusted so that, when its directional antenna is rotated to the position of maximum signal pick-up, the output passing through conductors 122 is of sufficient voltage to cause lamp 125 to flash. Assuming a sequence of 30 pictures to be transmitted by antenna 79 of Fig. 8, and this sequence to require one second for transmission, lamp 125 will flash once per second and always in the same angular position. If an actual floating compass bowl or scale is mounted under lamp 125, the lamp will give the loop direction or bearing toward the distant television station by direct reading (rather than the loop bearing relative to the fore-and-aft line of the plane). It will also indicate the correct functioning of both antennas 79 and 87 of Fig. 8 and the thereunto connected transmitting equipment.

In Fig. 20, the non-directional transmitter 150 sends out not only the line- and frame-synchronizing signals but also an "indicial" signal, which is an identificable indication of the exact instant when the directional transmitter 155 which is therewith associated is sending a signal in the north or "zero bearing" direction (and when the north or zero bearing frame of the sequence of views or films is about to be transmitted). The signals from 150 travel as indicated by the various arrows 151, 152, 153, 154, for example. Numeral 157 represents a non-directional receiver which, under the conditions shown receives an incoming signal from transmitter 150 along line 159 but would receive such signal regardless of the line of bearing between 150 and 157. The output of receiver 157 passes through 163 and partly to a frame synchronizing signal selector 164 and also an indicial signal selector 165. The nature of 165 will be described in relation to Fig. 17. Selector 164 is of the type described, for example, in U. S. patent to R. D. Kell, Number 2,178,758, issued November 7, 1939. The output of 164 passes through amplifier 166 after the frame-synchronizing signal only has been selected. The amplified frame synchronizing signal passes through conductor 169 to the variable speed motor 171. This latter may be driven slightly above synchronous speed by the frame synchronizing signal or, preferably, may be driven from any local source of power and also at a speed slightly in excess of synchronous speed (that is, less than one revolution) per complete sequence of pictures corresponding to one cycle of operation of directional transmitter 155). In the generally preferable event that a local source of power to drive motor 171 is used, elements 164, 189, 166 and 169 are omitted. Mounted on the shaft 178 of motor 171 is an outward-projecting electro-magnet or pole 177 which acts as one portion of an electric detent or "dog." Direct current is fed to pole 177 through slip rings 178 from, for example, battery 174. The co-acting detent pole 172 is fixedly mounted so that the flow of direct current therethrough will, in the event that poles 172 and 177 are opposite each other when both are energized, tend to lock them together and thus to prevent the rotation of shaft 178. The width of the pole pieces of the detent poles should preferably be less than the drift or speed error of the motor drive per sequence of pictures.

The output of indicial signal selector 165 is amplified in 167 and then rectified if desired in 168, thereafter passing through and magnetizing 172 whenever the indicial signal is received. Accordingly, the motor 171 will be retarded or checked or even accelerated under the same conditions for a brief instant, to some extent, whenever an indicial produced current passes through 172 with 177 opposite thereto. Since the motor is running slightly above synchronous speed, it will "gain" on the indicial signals until it is thus locked into synchronism with the indicial signals. Further to steady the operation of this system, there may be added thereto if desired the flywheel 170. This flywheel has mechanical inertia (thus tending to maintain constant the average speed of the motor), and it has an elastic or resilient driving element as shown in Figs. 22a or 22b (thus preventing undue abruptness in speed fluctuations when the detent system 172, 177 acts). The elastic or resilient drive elements 170'.herein referred to are, as shown in Fig. 22a, some such elements as a number of helical or spiral springs 170' connecting the rim 170 to the shaft 178 of the flywheel; or alternatively a number of approximately straight springy elements 170' connecting the rim 170 to the shaft 178 in Fig. 22b. Further, there may be provided a damping force or frictional device (not shown) whereby oscillations or hunting of the elastic flywheel system may be prevented by methods well known in machine design which therefore need not be here described. Where desired, a local source of driving energy for the motor may be provided and made effective to the exclusion of the non-directional impulses by merely shifting the switch position to connect the local source to the motor instead of connecting the non-directional receiver with the motor.

The directional transmitter 155 of Fig. 20 sends out the picture and background signals, illustratively, and is received by the directional receiver 161 which is associated with the same installation as non-directional receiver 157. The direction of the incoming signal is indicated diagrammatically by 156, and the corresponding direction of receptivity of 161 by 162. The output of receiver 161 passes through conductor 184 to amplifier 185. Thus, when the strongest modulated carrier is receiver by 161 by virtue of the correct directional pointing of the therewith associated directional antenna, the output of amplifier 185 will be a maximum whenever the transmitter 155 sends a maximum radiation toward the receiver 161. By adjusting the amplification of 185, the output thereof which passes through 186, 187 to the indicator 181 (shown as a neon tube illustratively) will cause the indicator to function whenever the transmitter 155 sends its maximum radiation toward receiver 161. The indicator 181 is supplied with the output of amplifier 185 through the slip-rings 189 and the brushes 182, 183. It is caused to rotate as indicated by 188 through the drive 179 actuated from the motor 171 in such fashion that 181 makes one complete rotation for one cycle or sequence of pictures radiated from 155 or one cycle of directions of radiation of transmitter 155 from zero bearing back again to zero bearing. This indicator will be described in further detail in connection with Figs. 23 and 24.

Three types of indicial signals are shown illustratively in Fig. 21, but it should be understood that any identifiable form of indicial signal may be substituted for these. The forms shown happen to be particularly convenient. The first one, 200—206 consists of the addition to the usual frame synchronizing signal (corresponding to zero transmitter radiation or "blacker than black" as described in U. S. Patent No. 2,100,279, granted to R. H. George and H. J. Heim on November 23, 1937) of the alternating component 203, which is of such frequency that an adequate number of cycles to enable selectivity and response buildup are present. Thus, if the frame synchronizing signal has a length for example of 1/300 of a second, corresponding to distance 202—204, the indicial signal frequency shown by 203 may be, say, 6,000 cycles per second, thus providing 20 cycles in the space 202—204. The electrical circuits for generating and radiating such signals at the desired times are well known and need not be further described. The individual signal 210 differs from 203 only that it is unidirectional and pulsating (that is, half of the alternating component is removed by rectification, limitation, or otherwise). Indicia signal 217 differs from 210 in that it is a single brief pulse rather than a series of pulses as in 210. The selection of such indicial signals by 165 at the receiver (Fig. 20) may be by resonance, band-pass filtering action, or by wave-front selection as may be desired. The last-mentioned method is illustrated by the above mentioned U. S. patent to R. D. Kell, Number 2,178,758. Obviously, the selection of frequency, amplitude or other characteristics of the indicial signals must be such as not to interfere with accurate separation of the line and frame synchronizing signals.

Fig. 23 shows in greater detail the indicator arrangements which were generally described in connection with 181 in Fig. 20. In plan view, 240 is a magnetic or gyro compass scale (shown as a magnetic compass with needle 241) carrying the usual directional indications. Indicator 181 spins as indicated by arrow 244 in the annular path 243 outside of compass 240. 245 is a stationary direction-finder directional scale suitably located in association with the electric detent 172, 177 of Fig. 20 and the therewith associated directivity of transmission of transmitter 155. That is, the "N" or "0°" bearing on scale 245 is the place at which indicator 181 functions if transmitter 155 lies directly to the north of receiver 161 (Fig. 20). By a systematic checking and analysis of the bearings shown by the indicator on the inner and outer directional scales of Fig. 23, the correct functioning of the equipment can be continuously supervised and the existence of any radio direction finder errors noted.

The mechanical arrangements involved in Fig. 23 are schematically shown in Fig. 24. Here 240 is the magnetic or gyro compass corresponding to 240 of Fig. 23, and is shown in cross section as a magnetic compass. This is supported on the heavy shaft 263 which carries the bearing 264. The rotating indicator mount 265 is supported by this bearing 264, and carries a gear 266 on its outer portion, which gear is driven at the desired speed by the gear 267 through the gear box 269 and by the motor 171 which is the motor, the function and speed arrangements of which have already been described in connection with 171 in Fig. 20. The indicator 181 is mounted on 265 and has its terminals connected through insulated conductors 275, 276 to the slip rings 182, 183 which are insulatedly mounted on the lower side of the uppermost portion of indicator mount 265. The stationary scale 245 is fixedly mounted as shown more particularly by the fixed scale 245 of Fig. 23. It is clear that alternative mechanical arrangements to those of Fig. 24 are numerous, and any of these may be used without departing from the spirit and scope of this invention. Likewise, the arrangement of each other figure of the drawings and the description thereof is merely of an illustrative nature and each is capable of being modified within wide limits. One of such modifications which becomes particularly apparnt is the use of minimum strength signals in connection with directional reception since while for convenient reference in describing the operation of the apparatus in connection with directional reception, the method of operation which is described is based upon a maximum signal being received through the direction of maximum transmission and the direction of best reception being made coincident, it should be understood that the scope of the invention also includes all cases where a minimum signal is used as an indicator of direction or is used in connection with a maximum signal similarly received as a control or associated means. In addition, it will be apparent that under some conditions neither ships nor airplanes deviate to any great extent from a certain normal course. In this case, instead of scanning an entire hemisphere as shown and explained in connection with Fig. 3, for example, it is possible, particularly in a case where it is only desired to guide ships or airplanes following substantially a pre-determined course, to scan only a narrow segmental portion of the hemisphere. Under these conditions the scanning might follow, for example, a path including points 30, 31, 32, 33, 31, 34 and back to point 30 from which the same path of scanning would be re-traced.

In television, as usually understood, each transmitted picture line is usually considered to include a sequence of image signals. Further, in television, the image signals representing the total number of lines of picture resolution forming a complete picture field or picture frame is considered also to involve a sequence of image signals. There may be a plurality of such picture sequences where interlaced scanning of picture fields is utilized to form a complete picture frame.

Under such circumstances, there will be as many sequences of picture signals per picture frame as there are picture fields interlaced to form a single picture frame.

In the present invention, however, there comes into the consideration still another novel form of transmission which is the transmission of a plurality of pictures or images which differ, one from the other, in either azimuth or altitude or both azimuth and altitude of the scanning or viewing direction. Under these circumstances if it were assumed, for instance, that constant altitude were being maintained then for the changes in azimuth there would be produced a plurality of picture frames which give the desired azimuthal viewing throughout a 360° change in azimuth with selected angular change in azimuth provided between successive picture frames. As the term "sequence" will be used in the claims of this application, applicant intends to convey the thought that it defines a closed operational cycle wherein each different direction of viewing, whether embodying a change in azimuth or altitude or both, shall be included in the form of the transmission (or reception) of a complete picture thereof and that the complete sequence shall include the totality of single fields of view in each of the selected angularly displaced directions. So understood, it will be seen by referring in the claims to different series of sequences of cyclically repeated viewing directions, applicant will be referring to the summation of groups of the sequences last described which, of course, include the repetition of views over each of the angularly displaced viewing directions occurring according to a chosen operational sequence. Therefore, it will be understood within the meaning of this disclosure that when reference is made in these specifications, or in the claims, to a sequence of views, applicant is intending to refer to a single sequence of views which together comprise full panoramic viewing throughout all selected azimuthal and/or altitudinal viewing directions. Such sequences are systematically repeated during the transmission and, accordingly, each individual viewing direction and the image signals corresponding thereto, are, in turn, repeated within each sequence. Essentially, the methods of televisible guiding herein described employ a series of such panoramic sequence transmissions and the selection therefrom at receiving points of a minimum number of views within each sequence, such views corresponding in effect to the optical viewing of the significant region from the receiving point, were that physically possible, in the light of the methods herein disclosed.

In this specification and in the claims where applicant refers to various scanning paths or scanning directions it will be understood that applicant is referring, primarily for the purpose of simplification of description, to the path coinciding with the optical axis of the scanning medium, e. g. the scanning camera, whether the scanned area be the actual significant surface, a tri-dimensional replica of the significant surface, or a bi-dimensional replica of the significant surface. In actual scanning operation it is, of course, to be appreciated that the line of direction between the scanning medium or camera and the point of elemental area, which is instantaneously analyzed to obtain a representation of light value thereof, changes from instant to instant. It is because of this changing character of the actual line of direction between the scanning medium and the scanned area that applicant considers it preferable to use a generic term (i. e., scanning path or direction) to define this operation.

Having now described the invention what is claimed and desired to secure by Letters Patent is the following:

1. In a system for transmitting image signals delineatory of a significant surface, means for scanning substantially the same portion of the significant surface along a cyclically repeated sequence of angularly displaced directions radially inward to the center of a solid angle substantially centered in a predetermined location relative to the significant surface, said solid angle being bounded by a circle smaller in diameter than a great circle of a sphere on which the solid angle is measured, and in which the summation of each scanning sequence defines systematically the selected solid angle, means for developing for each radial direction of scanning a train of electrical image signals characterizing substantially the scanning field and means for transmitting the produced trains of electrical image signals directionally radially substantially instantaneously opposite to the corresponding chosen radial scanning directions.

2. In a system for transmitting image signals delineatory of a significant surface, means for scanning substantially the same portion of the significant surface along a cyclically repeated sequence of angularly displaced directions radially inward to the center of a solid angle substantially centered in a predetermined location relative to the significant surface, said solid angle being bounded by a circle smaller in diameter than a great circle of a sphere on which the solid angle is measured, and in which the summation of each scanning sequence defines systematically the selected solid angle, means for producing for each radial direction of scanning a train of electrical image signals characterising substantially the scanning field, means for transmitting the produced train of electrical image signals directionally radially substantially instantaneously opposite to the corresponding chosen radial scanning directions, and means for concurrently transmitting synchronizing signals for reproducing the rate of reproduction of the trains of electrical image signals.

3. In a system for transmitting image signals delineatory of a significant surface, means for scanning substantially the same portion of the significant surface along a cyclically repeated sequence of angularly displaced directions radially inward to the center of a solid angle substantially centered in a predetermined location relative to the significant surface, said solid angle being bounded by a circle smaller in diameter than a great circle of a sphere on which the solid angle is measured, and in which the summation of each scanning sequence defines systematically the selected solid angle, means for developing for each radial direction of scanning a train of electrical image signals characterizing the scanning field, means for transmitting the produced train of electrical image signals directionally radially instantaneously opposite to the corresponding chosen radial scanning directions, and means for concurrently non-directionally transmitting repetitive synchronizing signals representing the rate of reproduction of the trains of electrical image signals.

4. In a system for transmitting image signals delineatory of a significant surface, means for scanning substantially the same portion of the significant surface along a cyclically repeated sequence of angularly displaced directions radially inward to the center of a solid angle substantially centered in a predetermined location relative to the significant surface, said solid angle being bounded by a circle smaller in diameter than a great circle of a sphere on which the solid angle is measured, and in which the summation of each scanning sequence defines systematically the selected solid angle, means for developing for each radial direction of scanning a train of electrical image signals characterizing substantially the scanning field, means for transmitting the produced train of electrical image signals directionally radially instantaneously opposite to the corresponding chosen radial scanning directions, means for receiving the transmitted trains of electrical image signals, and means for reconstructing from the received electrical image signals an electro-optical replica of the significant surface from at least one of the said train successions of transmissions in each cycle.

5. In a system for transmitting image signals depicting a significant surface, means for scanning substantially the same portion of the significant surface along a cyclically repeated sequence of angularly displaced directions radially inward to the center of a solid angle substantially centered in a predetermined location relative to the significant surface, said solid angle being bounded by a circle smaller in diameter than a great circle of a sphere on which the solid angle is measured and in which the summation of each scanning sequence defines systematically the selected solid angle, means for developing for each radial direction of scanning a train of electrical image signals characterizing substantially the scanning field, means for transmitting the produced train of electrical image signals directionally radially instantaneously opposite to the corresponding chosen radial scanning directions, means for non-directionally transmitting synchronizing signals representing the rate of reproduction of the trans of electrical image signals concurrently with the image signals, means for receiving the directionally transmitted image signals and the non-directional transmitted synchronizing signals, and means for reconstructing an electro-optical replica of the significant surface under the control of at least one of the said successions of trains of image signal transmissions in each cycle and synthesizing the image signal reproduction under the control of the other of the signals received.

6. In a system for transmitting image signals depicting a significant surface, means for scanning substantially the same portion of the significant surface along a cyclically repeated sequence of angularly displaced directions radially inward to the center of a solid angle substantially centered in a predetermined location relative to the significant surface, said solid angle being bounded by a circle smaller in diameter than a great circle of a sphere on which the solid angle is measured and in which the summation of each scanning sequence defines systematically the selected solid angle, means for developing for each radial direction of scanning a complete train of electrical image signals characterizing substantially the scanning field, means for transmitting the produced train of electrical image signals directionally radially instantaneously opposite to the corresponding chosen radial scanning directions, means for non-directionally transmitting synchronizing signals representing the rate of reproduction of the trains of electrical image signals, means for receiving the directionally transmitted image signals and the non-directional transmitted synchronizing signals, means for reconstructing an electro-optical replica of the significant surface under the control of at least one of the said successions of trains of image signal transmissions in each cycle and synthesizing the image signal reproduction under the control of the other of the signals received, and means for limiting the trains of electrical image signals effective to produce the electro-optical replicas to a minor fraction of the total number of cyclically repeated sequences of trains of image signals in each sequence.

7. In a system for transmitting image signals delineatory of a significant surface, means for scanning substantially the same portion of the significant surface along radial paths lying within the surface generated by the rotation of a right angle triangle of substantially constant hypotenuse length about its vertical side as an axis and with its horizontal side spaced from the significant surface with a progressive change in the angle between the hypotenuse and the said vertical side to produce from each selected radial scanning path a train of electrical image signals representative of the scanned surface, and means for transmitting each produced train of electrical signals obliquely outward from the significant surface upon the chosen radial scanning direction.

8. In a system for transmitting image signals delineatory of a significant surface, means for scanning substantially the same portion of the significant surface along radial paths lying within the surface generated by the rotation of a right angle triangle of substantially constant hypotenuse length about its vertical side as an axis and with its horizontal side separated from the significant surface with a progressive change in the angle between the hypotenuse and the said vertical side to produce from each selected radial scanning path a train of electrical image signals representing the scanned surface, means for transmitting each produced train of electrical signals obliquely outward from the significant surface upon the chosen radial scanning direction, and means for concomitantly transmitting non-directional synthesizing signals representing the rate of production of each train of electrical image signals.

9. In a system for transmitting image signals depicting a significant surface, means for scanning substantially the same surface area of the surface along substantially obliquely positioned scanning paths for producing for each path of scanning a train of electrical image signals representing the significant surface, means for cyclically changing the oblique scanning paths along the generatrices of a conical surface having its axis perpendicular to the significant surface and its apex located at a predetermined point on the significant surface, means for transmitting each produced train of electrical image signals obliquely outwardly from substantially the apex of the cone and in the plane of said generatrix and the perpendicular axis of the cone, means for concomitantly and non-directionally transmitting synthesizing signals for indicating the rate at which the trains of electrical image signals are developed, and means for receiving the transmitted directional and non-directional signals for reconstructing synthesized electro-optical replicas of the scanned significant surface as represented at receiving points by at least one of the trains of signals occurring in each sequence of transmissions.

10. In a system for transmitting image signals depicting a significant surface, means for scanning substantially the same portion of the surface along obliquely positioned scanning paths for producing for each path of scanning a train of electrical image signals representing the scanned portion of the significant surface, means for cyclically changing the oblique scanning path along the generatrices of a conical surface having its axis perpendicular to the significant surface and its apex located at a predetermined point on the significant surface, means for transmitting each produced train of electrical image signals obliquely outwardly from substantially the apex of the cone and in the plane of said generatrix and the perpendicular axis of the cone.

11. In a system for transmitting image signals depicting a significant surface, means for scanning substantially the same portion of the surface along obliquely positioned scanning paths for producing for each path of scanning a train of electrical image signals representing the significant surface, means for cyclically changing the oblique scanning path along the generatrices of a conical surface having its axis perpendicular to the significant surface and its apex located at a predetermined point on the significant surface, means for transmitting each produced train of electrical image signals obliquely outwardly from substantially the apex of the cone and in the plane of said generatrix and the perpendicular axis of the cone, and means for repetitively and non-directionally transmitting synthesizing signals throughout the period of image signal transmission for indicating the rate at which the trains of electrical image signals are developed.

12. In a system for transmitting image signals delineatory of a significant surface, means for scanning the surface for producing a train of electrical image signals representing the scanned area of the surface, said scanning means comprising means for scanning substantially the same portion of the surface obliquely in a cyclically repeated succession of scanning paths along the generatrices of a conical surface having its axis perpendicular to the surface and its apex located in a predetermined position relative to the surface, means for transmitting each produced train of electrical signals obliquely outwardly from the significant surface in the plane of said generatrix and the perpendicular axis of the cone and radiating from a predetermined point relative to the surface and the apex of the cone, means for concomitantly transmitting from a predetermined transmitting point auxiliary signals representing the rate of reproduction of each train of electrical image signals, means for receiving the transmitted image signals and the signals indicating the rate of production of the image signals, means for reconstructing from the received image signals an electro-optical replica of the significant surface, means for synthesizing the electro-optical image production in accordance with the auxiliary signals transmitted, and means for limiting the electro-optical reproductions of received image signals to a minor fraction of the total number of cyclically repeated representations of the significant surface in the transmitted sequence.

13. In a system for transmitting image signals delineatory of a significant surface, means for scanning substantially the same portion of the surface from obliquely changing scanning positions in cyclically repeated sequences for producing trains of electrical image signals representing the delineations of the significant surface, means for changing in a predetermined operational cycle the oblique scanning positions along the generatrices of a conical surface having its axis perpendicular to the significant surface and its apex located at a predetermined point relative to the surface, means for transmitting the produced trains of electrical signals obliquely outward from a point located substantially on the axis of the cone and at a predetermined point relative to the cone apex and to the significant surface and in the plane of the generatrix and the perpendicular axis of the cone, means for non-directionally transmitting as an accompanying control signals representing the rate of production of each independent train of electrical image signals in each sequence of signals, means for receiving the transmitted image and non-directional signals, and means for reconstructing from the received image signals the electro-optical replica of the significant surface from at least one of the trains of electrical image signals in the sequence of transmissions in each cycle.

14. In a system for transmitting image signals delineatory of a significant surface, means for scanning the surface for producing a train of electrical image signals representing the scanned area of the surface, said scanning means comprising means for scanning substantially the same portion of the surface obliquely in a cyclically repeated succession of scanning paths along the generatrices of a conical surface having its axis perpendicular to the surface and its apex located in a predetermined position relative to the surface, and means for transmitting each produced train of electrical signals obliquely outwardly from the surface in the plane of said generatrix and the perpendicular axis of the cone and from a predetermined point relative to the surface and the apex of the cone.

15. In a system for transmitting image signals delineatory of a significant surface, means for repeatedly scanning substantially the same portion of the surface for producing a train of electrical image signals representing the scanned area of the surface, said scanning means comprising means for scanning the surface obliquely in a cyclically repeated succession of scanning paths along the generatrices of a conical surface having its axis perpendicular to the surface and its apex located in a predetermined position relative to the surface, means for transmitting each produced train of electrical signals obliquely outwardly from the surface in the plane of said generatrix and the perpendicular axis of the cone and from a predetermined point relative to the surface and the apex of the cone, and means for concurrently transmitting from a predetermined point auxiliary signals representing the rate of reproduction of each train of electrical image signals.

16. In a system for transmitting image signals delineatory of a significant surface, means for scanning substantially the same portion of the surface from obliquely changing scanning positions in cyclically repeated sequences for producing trains of electrical image signals representing the delineations of substantially the same portion of the significant surface, means for changing in a predetermined operational cycle the oblique scanning positions along the generatrices of a conical surface having its axis perpendicular to the significant surface and its apex located at a predetermined point relative to the surface, and means for transmitting the produced trains of electrical signals obliquely outward from a transmission point substantially on the axis of the cone and at a predetermined point relative to the cone apex and to the significant surface and in a direction coinciding substantially with the plane of the generatrix and the perpendicular axis of the cone.

17. In a system for transmitting image signals delineatory of a significant surface, means for scanning substantially the same portion of the surface from obliquely changing scanning positions in cyclically repeated sequences for producing trains of electrical image signals representing the delineations of the significant surface, means for changing the oblique scanning positions in a predetermined operational cycle along the generatrices of a conical surface having its axis perpendicular to the significant surface and its apex located at a predetermined point relative to the surface, means for transmitting the produced trains of electrical signals obliquely outward from a transmission point substantially on the axis of the cone and at a predetermined point relative to the cone apex and to the significant surface and in a direction substantially coinciding with the plane of the generatrix and the perpendicular axis of the cone, and means for concomitantly non-directionally transmitting signals representing the rate of production of each independent train of electrical image signals in each sequence of signals.

18. In a system for transmitting image signals delineatory of a significant surface, means for scanning substantially the same portion of the significant surface along radial scanning paths lying within the surface generated by the rotation of a right angle triangle of substantially constant hypotenuse length about its vertical side as an axis and with its horizontal side separated from the significant surface with a progressive change in the angle between the hypotenuse and the said vertical side to produce from each selected radial scanning path a train of electrical image signals representative of the scanned area of the surface, means for transmitting each produced train of electrical image signals obliquely outward upon each corresponding chosen radial scanning direction, and means for concurrently and repetitively transmitting non-directional signals representing the rate of production of each train of electrical image signals along each radial path of scanning.

19. In a system for transmitting image signals delineatory of a significant surface, means for scanning substantially the same portion of the significant surface along radial scanning paths lying within the surface generated by the rotation of a right angle triangle of substantially constant hypotenuse length about its vertical side as an axis and with its horizontal side separated from the significant surface with a progressive change in the angle between the hypotenuse and the said vertical side to produce from each selected radial scanning path a train of electrical image signals delineating the significant area, means for transmitting each produced train of electrical image signals obliquely outwardly upon each corresponding chosen radial scanning direction, means for concomitantly and non-directionally transmitting signals representing the rate of production of each train of electrical image signals along each radial scanning path, means for receiving the transmitted image and non-directional signals, and means for reconstructing from the received signals an electro-optical replica of the significant surface synthesized with the image signal transmission under the control of the non-directional signals.

20. In a system for transmitting image signals delineatory of a significant surface, means for scanning substantially the same portion of the significant surface along radial scanning paths lying within the surface generated by the rotation of a right angle triangle of substantially constant hypotenuse length about its vertical side as an axis and with its horizontal side spaced from the significant surface with a progressive change in the angle between the hypotenuse and the said vertical side to produce from each selected radial scanning path a train of electrical image signals delineating the significant area scanned, means for transmitting each produced train of electrical image signals obliquely outwardly upon each chosen radial scanning direction, means for concurrently and non-directionally transmitting signals representing the rate of production of each train of electrical image signals along each radial path of scanning, means for receiving the directionally transmitted image signals and the non-directional control signals, means for reconstructing from the received signals an electro-optical replica of the significant surface synthesized under the control of the non-directional signals, and means for limiting the electro-optical reproductions of images to a minor fraction of the total number of cyclically repeated trains of image signals representative of the significant surface.

21. In a system for transmitting image signals delineatory of a significant surface, means for scanning substantially the same portion of the significant surface along radial lines of scanning direction terminating outwardly upon a sequence of substantially like portions of vertical great circles normal to the plane of the significant surface and substantially centered thereon and substantially equi-angularly displaced in azimuth from one another to produce from each scanning a train of electrical image signals characteristic of the scanned surface area, and means for transmitting each produced train of electrical image signals directionally and obliquely outwardly upon the coordinated chosen radial scanning direction.

22. In a system for transmitting image signals delineatory of a significant surface, means for scanning substantially the same portion of the significant surface along radial lines of scanning direction terminating outwardly upon a sequence of substantially like portions of vertical great circles normal to the plane of the significant surface and substantially centered thereon, and substantially equi-angularly displaced in azimuth from one another to produce from each scanning a train of electrical image signals characterizing electrically the surface area scanned, means for transmitting each produced train of electrical image signals obliquely and directionally outwardly upon the coordinated chosen radial scanning direction, and means for concomitantly transmitting non-directional signals representing the rate of production of each train of electrical image signals along each radial path of scanning.

23. In a system for transmitting image signals delineatory of a significant surface, means for scanning substantially the same portion of the significant surface along radial lines of scanning direction terminating outwardly upon a sequence of substantially like portions of vertical great circles normal to the plane of the significant surface and substantially centered thereon and substantially equi-angularly displaced in azimuth from one another to produce from each scanning a train of electrical image signals delineating the surface area scanned, means for transmitting each produced train of electrical image signals obliquely and directionally outwardly upon the coordinated chosen radial scanning direction, means for concomitantly producing and transmitting non-directional synthesizing signals representing the rate of production of each train of electrical image signals along each radial path of scanning, means for receiving the directionally transmitted image and the non-directional synthesizing signals, and means for reconstructing from the received signals an electro-optical replica of the significant surface synthesized under the control of the non-directional signals.

24. In a system for transmitting image signals delineatory of a significant surface, means for scanning substantially the same portion of the significant surface along radial lines of scanning direction terminating outwardly upon a sequence of substantially like portions of vertical great circles normal to the plane of the significant surface and substantially centered thereon, and substantially equi-angularly displaced in azimuth from one another to produce from each scanning a train of electrical image signals representative of the scanned surface area, means for transmitting each produced train of electrical image signals obliquely and directionally outwardly upon the coordinated chosen radial scanning direction, means for concomitantly producing and transmitting non-directional synthesizing signals representing the rate of production of each train of electrical image signals along each radial path of scanning, means for receiving the directionally transmitted image and the non-directional synthesizing signals, means for reconstructing from the received signals an electro-optical replica of the significant surface synthesized under the control of the non-directional signals, and means for limiting the electro-optical reproductions of images to a minor fraction of the total number of cyclically repeated trains of image signals representative of the significant surface.

25. In a system for transmitting image signals delineatory of a significant surface, means for scanning substantially the same portion of the significant surface along a cyclically repeated sequence of angularly displaced scanning directions radially inward to the center of a solid angle substantially centered in a predetermined location relative to the significant surface, said solid angle being bounded by a circle smaller in diameter than a great circle of a sphere upon which the solid angle is measured and in which the summation of each scanning sequence defines systematically the selected solid angle, means for developing for each radial direction of scanning a train of electrical image signals characterizing substantially the scanning path, means for transmitting the developed trains of electrical image signals directionally radially instantaneously opposite to the corresponding chosen radial scanning direction, means to produce synthesizing signals for each train of image signal energy, means to produce supplemental synthesizing signals indicial of the occurrence of the directional sequence of image scanning paths, and means for concomitantly transmitting the plurality of produced synthesizing signals for indicating the rate at which each of the produced trains of electrical image signals is developed and the sequence at which each of the image signal trains repeats.

26. In a system for transmitting image signals depicting a significant surface, means for scanning substantially the same portion of the surface in a predetermined sequence of scanning paths each of which is an obliquely positioned path relative to the surface for producing for each path of scanning a train of electrical image signals representing substantially the same portion of the significant surface, means for cyclically changing the oblique scanning path along the generatrices of a conical surface having its axis perpendicular to the significant surface and its apex located at a predetermined point relative to the significant surface, means for transmitting each produced train of electrical image signals obliquely outwardly from a point located substantially on the axis of the cone and in the plane of said generatrix and the perpendicular axis of the cone, means to produce synthesizing signals for each train of image signal energy, means to produce supplemental synthesizing signals indicial of the occurrence of the directional sequence of image scanning paths, means for concomitantly and non-directionally transmitting each of the synthesizing signals for indicating the rate at which each of the produced trains of electrical image signals is developed and the sequence at which each of the image signal trains repeats.

27. A film record comprising a plurality of image areas each representing different cyclically repeated views of a significant surface displaced one from the other in at least one of azimuthal and altitudinal displacements, a border area for each film frame having thereon indicia of at least one of altitude and azimuth displacement from a predetermined reference direction, said successive indicia being progressively shifted within the border area to indicate by the displacement thereof the change in at least one of altitude and azimuth between successive views in substantially non-overlapping position for each minor number of indicia.

28. A film record comprising a plurality of film frame areas each representing a different view of a cyclically repeated series of views of a significant surface, each of said film frame areas representing a different view of the surface and each being displaced one from the other in at least one of altitude and azimuth displacements, border areas located in predetermined positions relative to the image area of each film frame, each of said border areas having an indication of the compass quadrant marked thereupon at either end and interposed between each successive frame of said film, and a marking of bearing indication within the border area, said successive azimuth indication markings being progressively shifted within the border areas to indicate between successive frames in a non-overlapping position the azimuthal changes between the said frames.

29. A film record comprising a plurality of film frame areas each representing a different view of a cyclically repeated series of views of a significant surface, each of said film frame areas representing a different view of the surface and each being displaced one from the other in at least one of altitude and azimuth displacements, border areas located in predetermined positions relative to the image area of each film frame, each of said border areas having an indication of the compass quadrant marked thereupon at either end and interposed between each successive frame of said film, and a marking of azimuth indication within the border areas, said successive azimuth indication markings being progressively shifted within the border areas to indicate between successive frames in a non-overlapping position the azimuthal changes between the said frames, and a second border area having therein an indication of altitudinal displacement of the film frame relative to the plane of the significant surface.

30. A film record comprising a plurality of film frame areas, each of said areas representing a significant surface viewed from one of cyclically changing angularly displaced directions each of which directions is radially inward to the center of a solid angle substantially centered in a predetermined location relative to the pictured area and wherein the solid angle is bounded by a circle smaller in diameter than a great circle of a sphere on which the solid angle is measured, said film frames collectively systematically defining in their summation the selected solid angle.

31. A film record comprising a plurality of film frame areas each representing a different view of a cyclically repeated series of views of a significant surface, each of said film frame areas representing a different view of the surface being displaced one from the other in at least one of altitude and azimuth displacements, border areas located in predetermined positions relative to the image area of each film frame, each of different border areas having an indication of the compass quadrant marked thereupon at either end and interposed between each successive frame of said film, and a marking of azimuth indication within the border areas, said successive film indication markings being progressively shifted within the border areas to indicate between successive frames in a non-overlapping position the azimuthal changes between the said frames, and a second border area having therein an indication of altitudinal displacement of the said film frame relative to the plane of the significant surface, said successive altitudinal marking being progressively shifted within the border area to indicate between successive frames in substantially non-overlapping positions the altitudinal changes between the said successive frames.

32. A method for transmitting image signals delineatory of a significant surface which includes the steps of scanning substantially the same portion of the significant surface along a cyclically repeated sequence of angularly displaced directions radially inward to the center of a solid angle substantially centered in a predetermined location relative to the significant surface, the solid angle being bounded by a circle smaller in diameter than a great circle of a sphere on which the solid angle is measured, and in which the summation of each scanning sequence defines systematically the selected solid angle, developing for each radial direction of scanning a train of electrical image signals characterizing substantially the scanning field and transmitting the produced train of electrical image signals directionally radially instantaneously opposite to the corresponding chosen radial scanning directions.

33. A method for transmitting image signals delineating a significant surface, which includes the steps of scanning substantially the same portion of the significant surface along a cyclically repeated sequence of angularly displaced directions radially inward to the center of a solid angle substantially centered in a predetermined location relative to the significant surface, the solid angle being bounded by a circle smaller in diameter than a great circle of a sphere on which the solid angle is measured and in which the summation of each scanning sequence defines systematically the selected solid angle, developing for each radial direction of scanning a train of electrical image signals characterizing substantially the scanning field, transmitting the produced train of electrical image signals directionally radially instantaneously opposite to the corresponding chosen radial scanning directions, and concomitantly transmitting synchronizing signals for reproducing the rate of reproduction of the trains of electrical image signals.

34. A method for transmitting image signals delineatory of a significant surface, which includes the steps of scanning substantially the same portion of the significant surface along a cyclically repeated sequence of angularly displaced directions radially inward to the center of a solid angle substantially centered in a predetermined location relative to the significant surface, said solid angle being bounded by a circle smaller in diameter than a great circle of a sphere on which the solid angle is measured, and in which the summation of each scanning sequence defines systematically the selected solid angle, developing for each radial direction of scanning a train of electrical image signals characterizing the scanning field, transmitting the produced train of electrical image signals directionally radially instantaneously opposite to the corresponding chosen radial scanning directions, and concomitantly nondirectionally transmitting synchronizing signals representing the rate of reproduction of the trains of electrical image signals.

35. A method for transmitting image signals characterizing a significant surface, which includes the steps of scanning substantially the same portion of the significant surface along a cyclically repeated sequence of angularly displaced directions radially inward to the center of a solid angle substantially centered in a predetermined location relative to the significant surface, said solid angle being bounded by a circle smaller in diameter than a great circle of a sphere on which the solid angle is measured, and in which the summation of each scanning sequence defines systematically the selected solid angle, developing for each radial direction of scanning a train of electrical image signals representing the scanned area, transmitting the produced train of electrical image signals directionally radially opposite to the corresponding chosen radial scanning directions, receiving the transmitted trains of electrical image signals, and reconstructing from the received electrical image signals an electro-optical replica of the significant surface from at least one of the said train successions of transmissions in each cycle.

36. A method for transmitting image signals delineating a significant surface, which includes the steps of scanning substantially the same portion of the significant surface along a cyclically repeated sequence of angularly displaced directions radially inward to the center of a solid angle substantially centered in a predetermined location relative to the significant surface, said solid angle being bounded by a circle smaller in diameter than a great circle of a sphere on which the solid angle is measured and in which the summation of each scanning sequence defines systematically the selected solid angle, developing for each radial direction of scanning a train of electrical image signals characterising substantially the scanning field transmitting the produced train of electrical image signals directionally radially opposite to the corresponding chosen radial scanning directions, concurrently nondirectionally transmitting synchronizing signals representing the rate of reproduction of the trains of electrical image signals, receiving the directionally transmitted image signals and the non-directional transmitted synchronizing signals, reconstructing an electro-optical replica of the significant surface under the control of at least one of the said successions of trains of image signal transmissions in each cycle and synthesizing the image signal reproduction under the control of the other of the signals received.

37. A method of producing and then transmitting image signals delineatory of a significant surface which comprises scanning substantially the same portion of the significant surface along radial scanning paths lying within the surface generated by the rotation of a right angle triangle of substantially constant hypotenuse length about its vertical side as an axis and with its horizontal side spaced from the significant surface with a progressive change in the angle between the hypotenuse and the said vertical side to produce from each selected scanning path a train of electrical image signals representative of the scanned surface area, and transmitting each produced train of electrical signals obliquely and directionally outwardly from the significant surface upon the corresponding radial scanning direction.

38. A method of transmitting image signals depicting a significant surface, which comprises scanning substantially the same portion of the surface along obliquely positioned scanning paths for producing for each path of scanning a train of electrical image signals representing the scanned area of the significant surface, cyclically shifting the oblique scanning path along the generatrices of a conical surface having its axis perpendicular to the significant surface and its apex located substantially at a predetermined point on the significant surface, and transmitting each produced train of electrical image signals obliquely outwardly from substantially the apex of the cone and in the plane of said generatrix and the perpendicular axis of the cone.

39. The method of transmitting image signals delineatory of a significant surface which includes the steps of scanning the surface for producing a train of electrical image signals representing the scanned surface area by scanning substantially the same portion of the surface obliquely in a cyclically repeated succession of scanning paths along the generatrices of a conical surface having its axis perpendicular to the surface and its apex located in a predetermined position relative to the surface, then transmitting each of the produced trains of electrical signals obliquely outwardly from the surface in planes coinciding substantially with said generatrices and the perpendicular axis of the cone and initiating the radiation of energy from a predetermined point relative to the surface and the apex of the cone.

40. A method of transmitting image signals delineatory of a significant surface which includes the steps of scanning the surface for producing a train of electrical image signals representing the scanned area of the surface by scanning substantially the same portion of the surface obliquely along a cyclically repeated succession of scanning paths substantially coincident with the generatrices of a conical surface having its axis perpendicular to the surface and its apex located in a predetermined position relative to the surface, transmitting each of the produced trains of electrical signals obliquely outwardly from the surface in planes coinciding substantially with the generatrices and the perpendicular axis of the cone, from a predetermined point relative to the surface and the apex of the cone, and concomitantly transmitting from a predetermined point auxiliary signals representing the rate of reproduction of each train of electrical image signals.

41. A method of transmitting image signals delineatory of a significant surface which includes the steps of scanning substantially the same area of the significant surface from obliquely changing positions in cyclically repeated sequences for producing trains of electrical image signals representing the scanned area of the significant surface, changing the oblique scanning positions in a predetermined operational cycle along the generatrices of a conical surface having its axis perpendicular to the significant surface and its apex located at a predetermined point relative to the surface, and then transmitting the produced trains of electrical signals obliquely and directionally outwardly from a transmission point substantially on the axis of the cone and at a predetermined point relative to the cone apex and to the significant surface and in a direction coinciding substantially with the plane of the generatrix and the perpendicular axis of the cone.

42. A method of transmitting image signals delineatory of a significant surface which comprises the steps of scanning substantially the same portion of the surface from obliquely changing scanning positions in cyclically repeated sequences for producing trains of electrical image signals representing the scanned portion of the significant surface, changing the oblique scanning positions in a predetermined cycle of operation along the generatrices of a conical surface having its axis perpendicular to the significant surface and its apex located at a predetermined point relative to the surface, transmitting the produced trains of electrical signals obliquely outward from a transmission point substantially on the axis of the cone and at a predetermined point relative to the cone apex and to the significant surface and in a direction substantially coinciding with the plane of the generatrix and the perpendicular axis of the cone, and concurrently non-directionally transmitting signals representing the rate of production of each independent train of electrical image signals in each sequence of signals.

43. A method of transmission comprising scanning substantially the same area of a significant surface along radial paths lying within the surface generated by the rotation of a right angle triangle of substantially constant hypotenuse length about its vertical side as an axis and with its horizontal side separated from the significant surface with a progressive change in the angle between the hypotenuse and the said vertical side to produce from each selected radial scanning path a train of electrical image signals delineatory of the scanned area of the surface, transmitting each produced train of electrical image signals obliquely outward upon each corresponding radial scanning direction, and concurrently and continuously non-directionally transmitting signals representing the rate of production of each train of electrical image signals along each radial path of scanning.

44. A method of producing and transmitting image signals delineatory of a significant surface comprising scanning substantially the same area of the significant surface along radial lines of scanning direction terminating outwardly upon a sequence of substantially like portions of vertical great circles normal to the plane of significant surface and substantially centered thereon and substantially equi-angularly displaced in azimuth from one another to produce from each scanning a train of electrical image signals electrically characterizing the surface area scanned, and transmitting each produced train of electrical image signals obliquely and directionally outwardly upon the coordinated chosen radial scanning direction.

45. A method of producing and transmitting image signals delineatory of a significant surface which comprises scanning substantially the same portion of the significant surface along radial lines of scanning direction terminating outwardly upon a sequence of substantially like portions of vertical great circles normal to the plane of significant surface and substantially centered thereon and substantially equi-angularly displaced in azimuth from one another to produce from each scanning a train of electrical image signals delineating the surface area scanned, transmitting each produced train of electrical image signals obliquely and directionally outwardly upon the coordinated chosen radial scanning direction, and concomitantly producing and transmitting non-directional synthesizing signals representing the rate of production of each train of electrical image signals along each radial path of scanning.

46. In a system for transmitting image signals delineatory of substantially the same portion of a significant surface, a film record having included thereon a cyclically repeated sequence of film frames representing in a predetermined sequence an azimuthally displaced series of views of substantially the same portion of the significant surface which are distinguishable one from the other and which represent the significant surface viewed from a predetermined altitudinal angle, means for scanning the successive frames of the motion picture film in sequence to produce from each film frame scanning a train of image signal energy representative of substantially the same portion of the significant surface as pictorially indicated by the film frames, means for directionally radiating the signal energy developed, means for co-ordinating the direction of radiation with the direction of viewing the significant surface as represented by both the azimuthal displacement and the altitudinal angle of the individual film frames scanned and means for maintaining the film frame scannings and the signal radiation synchronous and co-ordinated in the established relationship.

47. In a system for transmitting image signals delineatory of substantially the same portion of a significant surface, a looped and continuous film record having included thereon a cyclically repeated sequence of film frames representing in a predetermined sequence a series of angularly displaced views of substantially the same portion of the significant surface and border indicia areas by which the several film frames are additionally distinguishable one from the other in each of azimuthal and altitudinal displacements, a film scanning means, means for moving the film loop relative to the film means for scanning the successive frames of the motion picture film and the accompanying border indicia in sequence to produce from each film frame scanning a train of image signal energy representative of substantially the same portion of the significant surface as pictorially indicated by the film frames and signals representative of the border indicia, means for radiating the signal energy developed directionally in both azimuthally and altitudinally displaced paths, means for co-ordinating the altitudinal and azimuthal directions of radiation with the altitudinally and azimuthally displaced directions of viewing the significant surface as represented by the border area indicia of the individual film frames scanned, and means maintaining the film frame scannings and the signal radiation synchronous and co-ordinated in the established relationship of azimuth and altitude.

48. In a directional indicating system for transmitting image signals delineatory of substantially the same portion of a significant surface, a loop and continuous film record having included thereon a cyclically repeated sequence of film frames representing in a predetermined sequence a series of azimuthally displaced pictorial views of substantially the same portion of the significant surface which are distinguishable one from the other and which represent the significant surface viewed from a predetermined altitudinal angle, said film also having border areas having thereon indicia to identify and graphically designate the said azimuthal and altitudinal displacements, a film scanning means, means for moving the film relative to the film scanning means to scan the successive pictorial and indicia areas of the film frames of the motion picture film in sequence and produce from each film frame scanning a train of image signal energy representative of the pictorially represented significant surface and the indicia co-ordinated therewith, means for directionally radiating the signal energy developed throughout substantially a 360 degree arc for each complete film loop scanning, means for co-ordinating the direction of radiation with the direction of viewing the significant surface as represented by both the azimuthal displacements and the altitudinal angle of the individual film frames scanned, and means for maintaining the film frame scannings and the signal radiation synchronous and the instantaneously co-ordinated and established radiation path such that the direction of radiation and the azimuthal and altitudinal displacements of the radiation coincides substantially with that indicia represented on each film frame.

49. In a system for transmitting image signals delineatory of a significant surface, a scanning means, means for scanning the surface by the scanning means to produce a group of image signals delineating the scanned surface, means for quasi-repeating, in each successive scanning, the scanning of substantially the same portion of the significant surface in a sequence of directions corresponding to effective relative changes in angular displacement of at least one of altitude and azimuth of the scanning means with respect to the surface and predominantly inclined to the normal to the significant surface, means for repeating the scannings in the predetermined sequence of directions and at a predetermined repetition rate for the individual sequences, and means for transmitting the produced groups of image signals delineating the scanned surface substantially instantaneously directionally radially opposite to the corresponding effectively chosen scanning directions.

50. The method of transmitting image signals delineatory of a significant surface which includes the steps of scanning the surface to produce a group of image signals delineating the scanned surface, quasi-repeating, for each successive scanning, the scanning of substantially the same portion of the significant surface in a sequence of directions corresponding to effective relative changes in angular displacement of at least one of altitude and azimuth of the scanning direction with respect to the significant surface and predominantly at angles to the normal to the significant surface, repeating the scannings of the significant surface in a predetermined sequence of directions and at a predetermined repetition rate for the individual sequences, and transmitting the groups of image signals produced to delineate the scanned surface substantially instantaneously directionally radially opposite to the corresponding effectively chosen scanning directions.

ALFRED N. GOLDSMITH.